(12) United States Patent
Jinnai et al.

(10) Patent No.: US 6,170,333 B1
(45) Date of Patent: *Jan. 9, 2001

(54) APPARATUS FOR DETECTING ABNORMAL SOUND AND METHOD FOR JUDGING WRONG IN MACHINE

(75) Inventors: Michihiro Jinnai, Takamatsu; Hiroshi Yamaguchi, Kita-gun; Yoshinao Ishihara; Jun Ohshima, both of Tokyo; Fujitaka Taguchi, Yokohama; Masahiro Arakawa, Funabashi; Yoshikazu Kidu, Iruma, all of (JP)

(73) Assignee: Entropy Software Laboratory, Inc., Kagawa (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/042,023

(22) Filed: Mar. 13, 1998

(30) Foreign Application Priority Data

Mar. 14, 1997 (JP) .................................................. 9-061007

(51) Int. Cl.$^7$ .................................................. G01H 17/00
(52) U.S. Cl. .................................................. 73/570
(58) Field of Search ........................................ 73/570, 579

(56) References Cited

FOREIGN PATENT DOCUMENTS

| 58-129247 | 8/1983 | (JP) . |
|---|---|---|
| 2227617 | 9/1990 | (JP) . |
| 4316198 | 11/1992 | (JP) . |
| 5126980 | 5/1993 | (JP) . |

Primary Examiner—Richard A. Moller

(57) ABSTRACT

A standard pattern vector of a normal sound, an input pattern vector of a monitored sound, a positive vector of a reference pattern, and a negative vector of the reference pattern are produced. Regarding each element, the positive vector is increased by an absolute value of a difference between the input pattern vector and the standard pattern vector if the input pattern vector is greater than the standard pattern vector, and the negative vector is increased by the absolute value if the input pattern vector is less than the standard pattern vector. A difference of a kurtosis between the positive vector and the negative vector is calculated, wherein a center of the reference shape is relatively moved to a position of each element of the positive and negative vectors respectively at every calculation. A geometric distance value between the standard pattern vector and the input pattern vector is obtained by calculating a square root of a sum of a square of each kurtosis difference.

34 Claims, 19 Drawing Sheets

APPARATUS FOR DETECTING ABNORMAL SOUND AND METHOD FOR JUDGING WRONG IN MACHINE

FIELD OF THE INVENTION

This invention relates to an apparatus for detecting an abnormal sound and a method for judging something wrong in a machine. More specifically, this invention relates to a method for detecting something wrong with regard to a sound or an oscillation generated by an equipment in motion, a method for judging something wrong in a machine based on a detected value of the abnormal sound or the abnormal oscillation, a method for detecting a similarity between a standard oscillation wave and an arbitrary oscillation wave to be monitored and a method for recognizing a speech by using a detected value of the similarity.

BACKGROUND OF THE INVENTION

In a nuclear plant, a high pressure steam flows inside an equipment such as a heat exchanger and a pipe. In such a plant, for dealing with something wrong with the equipment, such as a leak of a steam, there is equipped a monitoring apparatus which detects abnormal sound generated by the equipment, then monitors whether there is something wrong with the equipment based on the detected value of the sound.

In a prior art, a standard pattern vector having, as an element, a feature value, such as a power spectrum of a normal sound, is previously registered, then an Euclid distance or an angle between the standard pattern vector and an input pattern vector is calculated. The input pattern vector is produced as a vector having, as an element, a feature value of a sound to be monitored. Further, in a prior art, something wrong in a machine is judged by comparing an allowed value with a calculated value of the Euclid distance or the angle.

Namely, in an N-dimensional space wherein N is equal to a number of kinds of the feature, a similarity of two pattern vectors is numerically evaluated, and then something wrong in the machine is judged based on the evaluated value. The similarity represents the angle or the Euclid distance which is a linear distance between a point of the standard pattern vector and a point of the input pattern vector.

For example, as shown in FIG. 17, a seven-dimensional standard pattern vector 10A is previously registered corresponding to a normal sound 10 of which a shape of a power spectrum is flat. The vector 10A has, an element or component, the power spectrum of the normal sound 10.

Then, corresponding to sounds 11, 12, 13 respectively to be monitored, seven-dimensional input pattern vectors 11A, 12A, 13A are produced. Each energy of monitored sounds 11, 12, 13 is equal to the energy of the normal sound 10, but a shape of a power spectrum of each monitored sounds 11, 12, 13 is different from the normal sound 10. The vector 11A has, an element or component, the power spectrum of the monitored sound 11. The vector 12A has, an element or component, the power spectrum of the monitored sound 12. The vector 13A has, an element or component, the power spectrum of the monitored sound 13. As a measure of a similarity between the standard pattern vector 10A and each of the input pattern vectors 11A, 12A, 13A, the Euclid distance or a cosine of the angle indicated by d11, d12, d13 is calculated.

It is assumed there is a relation between a parameter a and each of monitored sounds 11, 12, 13 as shown in FIG. 17.

Namely, as the relationship shown in FIG. 17, the parameter α prescribes a change of the each power spectrum shape of sounds 11, 12, 13 from the power spectrum shape of the normal sound 10.

The Euclid distance is obtained as a square root of a value which is a sum of a square of each difference between an element of the standard pattern vector and corresponding element of the input pattern vector. A cosine of the angle is obtained by dividing an inner product of two pattern vectors by a magnitude of two pattern vectors.

By the way, in case of using the Euclid distance or the angle as the measure of the similarity to the normal sound, it happens that the same value is obtained in plural sounds, while a shape of a power spectrum is different from each other. In such a case, it is impossible to distinguish sounds having different feature from each other, thus it is impossible to precisely detect an abnormal sound.

The following is a detailed description.

FIG. 18 shows a change of calculated value d11, d12, d13 of the Euclid distance when the parameter a in FIG. 17 is increased from 0 to 1.

FIG. 19 shows a change of calculated value d11, d12, d13 of the cosine of the angle when the parameter a in FIG. 17 is increased from 0 to 1.

As shown in FIGS. 18 and 19, the calculated value d11, d12, d13 of the Euclid distance or the cosine of the angle are always equal each other (d11=d12=d13). According to an increase of the parameter a, the Euclid distance value d11, d12, d13 are increased and the cosine value d11, d12, d13 of the angle are decreased. The angle itself is increased. By the way, generally a power spectrum shape of a white noise is flat and a power spectrum shape of a normal sound generated by the equipment in normal motion is almost the same as a white noise. A power spectrum shape of a noise is slightly changed according to time. Hereinafter, such slight change is called a "sway."

In FIG. 17, in a case that the parameter a is small, it is assumed that the sounds 11, 12 are "sway" sounds which slightly swayed from the normal sound 10 and that the sounds 13 is an abnormal sound based on a small leak of a steam etc.

As shown in FIGS. 18 and 19, when the parameter a is the same, the Euclid distance or the angle from the normal sound 10 is the same in each monitored sounds 11, 12, 13. Therefore, by comparing the value with an arbitrary determined allowed value, it is judged that all of three sounds 11, 12, 13 are normal, or conversely, it is judged that all of three sounds 11, 12, 13 are abnormal, then it is impossible to distinguish three sounds 11, 12, 13.

On the other hand, it may be considered to register many standard pattern vectors which correspond to the "sway" sounds from the normal sound 10. However, since there is a limitation in available number of registration of the standard pattern vector because of a memory capacity or processing speed of a computer, it is practically limited to distinguish the "sway" sounds generated by the equipment in normal motion from the abnormal generated by a small steam leak.

As mentioned-above, because prior art uses, as a measure of the similarity, the Euclid distance or the angle among two vectors, it is impossible to exactly detect the abnormal sound and it is impossible to judge something wrong in the machine with a greatly sufficient accuracy.

Therefore, an object of the present invention is to provide an apparatus and a method for detecting an abnormal sound, each of which can exactly obtain a geometric distance between the standard pattern vector and the input pattern vector from two vectors.

Another object of the present invention is to provide a method for exactly judging something wrong in a machine by using a value detected by the above-mentioned abnormal sound detection apparatus or method.

Another object of the present invention is to provide a method for detecting a similarity between a standard oscillation such wave as a voice and an arbitrary oscillation wave as a voice to be monitored, which can exactly obtain a geometric distance between the standard pattern vector and the input pattern vector from two vectors.

Another object of the present invention is to provide a method for recognizing a speech by using a similarity of the oscillation wave detected by the above-mentioned similarity detection method.

SUMMARY OF THE INVENTION

An apparatus for detecting an abnormal sound, according to the present invention comprises: means for producing a standard pattern vector having a feature value of a normal sound as an element, an input pattern vector having a feature value of a sound to be monitored as an element, a positive vector of a reference pattern having a value of arbitrary reference shape such as a normal distribution or a rectangle as an element and a negative vector of said reference pattern as an element; means for increasing, regarding each element, an element of said positive vector by an absolute value of a difference between an element of said input pattern vector and a corresponding element of said standard pattern vector if the element of said input pattern vector is greater than said corresponding element of said standard pattern vector and for increasing, regarding each element, an element of said negative vector by an absolute value of a difference between an element of said input pattern vector and a corresponding element of said standard pattern vector if the element of said input pattern vector is less than said corresponding element of said standard pattern vector; means for calculating a difference between a kurtosis of said positive vector processed by said increase means and a kurtosis of said negative vector processed by said increase means, wherein a center of said reference shape is relatively moved to a position of each element of said positive vector and said negative vector respectively at every said calculation of the difference of the kurtosis; and means for obtaining a value of geometric distance between said standard pattern vector and said input pattern vector by calculating a square root of a value which is a sum of a square of each difference of the kurtosis.

In the apparatus of the present invention, it is possible to modify the vector producing means to produce a standard pattern vector having a feature value of a normal oscillation of a machine as an element instead of the normal sound and an input pattern vector having a feature value of an oscillation of the machine to be monitored as an element instead of the sound to be monitored.

Further, in the apparatus of the present invention, it is possible to modify the geometric distance calculation means to obtain the value of geometric distance between the standard pattern vector and the input pattern vector by calculating a sum of a square of each difference of the kurtosis instead of calculating the square root.

A method for detecting an abnormal sound, according to the present invention comprises the steps of: producing a standard pattern vector having a feature value of a normal sound as an element, an input pattern vector having a feature value of a sound to be monitored as an element, a positive vector of a reference pattern having a value of arbitrary reference shape such as a normal distribution or a rectangle as an element and a negative vector of said reference pattern as an element; increasing, regarding each element, an element of said positive vector by an absolute value of a difference between an element of said input pattern vector and a corresponding element of said standard pattern vector if the element of said input pattern vector is greater than said corresponding element of said standard pattern vector and for increasing, regarding each element, an element of said negative vector by an absolute value of a difference between an element of said input pattern vector and a corresponding element of said standard pattern vector if the element of said input pattern vector is less than said corresponding element of said standard pattern vector; calculating a difference between a kurtosis of said positive vector processed by said increasing step and a kurtosis of said negative vector processed by said increasing step, wherein a center of said reference shape is relatively moved to a position of each element of said positive vector and said negative vector respectively at every said calculation of the difference of the kurtosis; and obtaining a value of geometric distance between said standard pattern vector and said input pattern vector by calculating a square root of a value which is a sum of a square of each difference of the kurtosis.

In the method of the present invention, it is possible to modify the vector producing step to produce a standard pattern vector having a feature value of a normal oscillation of a machine as an element instead of the normal sound, and produce an input pattern vector having a feature value of an oscillation of the machine to be monitored as an element instead of the sound to be monitored.

Further in the method of the present invention, it is possible to modify the geometric distance calculation step to obtain the value of geometric distance between the standard pattern vector and the input pattern vector by calculating a sum of a square of each difference of the kurtosis instead of calculating the square root.

A method for judging something wrong in a machine, according to the present invention comprises the steps of: comparing an arbitrarily determined allowed value with a geometric distance value between the standard pattern vector and the input pattern vector obtained by above-mentioned apparatus or method; and judging something wrong in a machine when the geometric distance value is greater than the allowed value.

A method for detecting a similarity between a standard oscillation wave and an arbitrary oscillation wave to be monitored according to the present invention, wherein the method comprises the steps of: producing a standard pattern vector having a feature value of a standard oscillation wave as an element, an input pattern vector having a feature value of an oscillation to be monitored as an element, a positive vector of a reference pattern having a value of arbitrary reference shape such as a normal distribution or a rectangle as an element and a negative vector of said reference pattern as an element; increasing, regarding each element, an element of said positive vector by an absolute value of a difference between an element of said input pattern vector and a corresponding element of said standard pattern vector if the element of said input pattern vector is greater than said corresponding element of said standard pattern vector and for increasing, regarding each element, an element of said negative vector by an absolute value of a difference between an element of said input pattern vector and a corresponding element of said standard pattern vector if the element of said input pattern vector is less than said corresponding element of said standard pattern vector; calculating a difference between a kurtosis of said positive vector processed by said increasing step and a kurtosis of said negative vector processed by said increasing step, wherein a center of said reference shape is relatively moved to a position of each element of said positive vector and said negative vector, respectively, at every said calculation of the difference of the kurtosis; and obtaining a value of geometric distance between said standard pattern vector and said input pattern vector by calculating a square root of a value which is a sum of a square of each difference of the kurtosis.

A method for recognizing a speech, according to the present invention, comprises the steps of: obtaining, by using the above-mentioned method, a value of geometric distance between a standard pattern vector having a feature value of a standard voice as an element and an input pattern vector having a feature value of a voice to be monitored as an element; comparing an arbitrarily determined allowed value with the geometric distance value between the standard pattern vector and the input pattern vector; and judging that the monitored voice is the standard voice when the geometric distance value is not greater than the allowed value and that the monitored voice is the standard voice when the geometric distance value is greater than the allowed value.

BRIEF DESCRIPTION OF THE DRAWINGS

FIG. 3($b$) shows a normalized power spectrum of the sample;

FIG. 4($b$) shows a positive vector having, as element, the value of the normal distribution;

FIG. 4($c$) shows a negative vector having, as element, the value of the normal distribution;

FIG. 5($b$) shows a typical sample of a shape of an input pattern vector;

FIG. 5($c$) shows a sample of a shape of a positive and a negative vector of a reference pattern;

FIG. 6($b$) shows a shape of an input pattern vector of which central part is increased than the typical sample of a standard pattern vector shown in FIG. 6($a$);

FIG. 6($c$) shows a shape change in the positive vector of a reference pattern;

FIG. 7($b$) shows a shape of an input pattern vector of which central part is decreased than the typical sample of a standard pattern vector shown in FIG. 7($a$);

FIG. 7($c$) shows a shape change in the negative vector of a reference pattern;

FIG. 8($b$) shows a shape of an input pattern vector of which side part is increased than the typical sample of a standard pattern vector shown in FIG. 8($a$);

FIG. 8($c$) shows a shape change in the positive vector of a reference pattern;

FIG. 9($b$) shows a shape of an input pattern vector of which side part is decreased than the typical sample of a standard pattern vector shown in FIG. 9($a$);

FIG. 9($c$) shows a shape change in the negative vector of a reference pattern;

FIG. 10($b$) shows a shape of an input pattern vector of which i-th element is increased than the standard pattern vector shown in FIG. 10($a$);

DETAILED DESCRIPTION OF PREFERRED EMBODIMENTS

Figure 1:
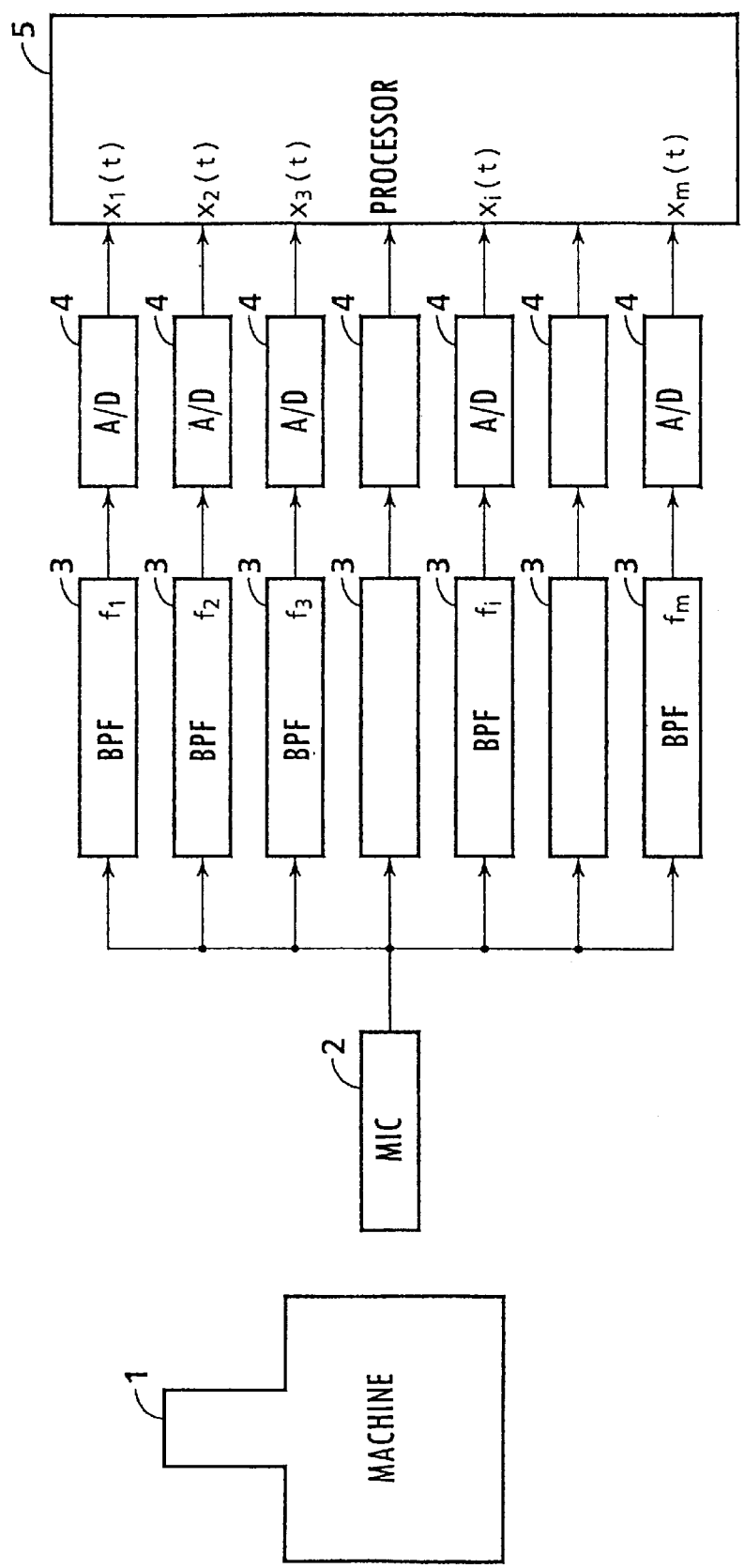
FIG. 1 shows an apparatus for measuring an abnormal sound in an embodiment.

A preferred embodiment of the present invention will be explained by referring to the drawings.

[Description of Principle]

Firstly, with regard to a case of using a normal distribution as a reference shape, a principle of the present invention is described.

In a statistical analysis, a normal distribution is usually used as a model of a phenomenon. Then, a "kurtosis" is used to verify whether a target phenomenon complies with the normal distribution. The kurtosis is a statistic.

A value of the kurtosis is equal to 3 when the target phenomenon complies with the normal distribution. A value of the kurtosis, of which distribution is sharper than the normal distribution, is greater than 3. Inversely, a value of the kurtosis, of which distribution is broader than the normal distribution, is less than 3. These relationships are always correct in spite of a variance of the normal distribution.

Therefore, a change or a modification of shapes between the standard pattern vector and the input pattern vector is replaced to a change or a modification of shape of a reference pattern vector having, as an element or a component, a value of the normal distribution. Further, an amount of the change or the modification of shape of the reference pattern vector is evaluated as an amount of change of the kurtosis. Then, it is possible to calculate, as a geometric distance, the similarity between the standard pattern vector and the input pattern vector.

However, generally, it is impossible to determine a negative element of a vector in a equation for calculating the kurtosis of the vector. Namely, it is necessary that each element of the reference vector is not a negative value in any relation of great and small sizes between the standard pattern vector and the input pattern vector.

Concretely, a positive vector of the reference pattern and a negative vector of the reference pattern are previously produced. The positive vector has a value of the normal distribution as its each element and also the negative vector has a value of the normal distribution as its each element. Then, with regard to each element, the element of the positive vector is increased by an absolute value of a difference between the element of the input pattern vector and a corresponding element of the standard pattern vector if the element of the input pattern vector is greater than the corresponding element of the standard pattern vector. And, with regard to each element, the element of the negative vector is increased by an absolute value of a difference between an element of the input pattern vector and a corresponding element of the standard pattern vector if the element of the input pattern vector is less than the corresponding element of the standard pattern vector. Next, the kurtosis of the positive vector is calculated and the kurtosis of the negative vector is calculated, then a difference between the kurtosis of the positive vector and the kurtosis of the negative vector is calculated.

At every calculation of the difference of the kurtosis, a center of the reference shape is relatively moved to a position of each element of the positive vector and the negative vector, respectively, since the kurtosis of the positive vector and the kurtosis of the negative vector are different from each other according to a relation between the central position of the normal distribution and each position of the element of the standard pattern vector and the input pattern vector. Then, a value of geometric distance between said standard pattern vector and said input pattern vector is obtained by calculating a square root of a value, which is a sum of a square of each difference of the kurtosis, or by calculating a sum of the square itself of each difference of the kurtosis instead of calculating the square root.

The above-mentioned geometric distance value exactly detects or represents a shape change or modification or difference between the normal sound (or a normal oscillation or vibration in the machine) and the abnormal sound (or an abnormal oscillation or vibration in the machine). Further the geometric distance value exactly detects or represents a similarity between an arbitrary standard oscillation such as a standard voice and an arbitrary monitored oscillation such as a monitored voice.

Therefore, it is possible to raise a precision of a detection of something wrong in a machine by using above-mentioned geometric distance since it is possible to exactly detect the shape difference between the standard pattern vector and the input pattern vector.

Further, it is possible to raise a precision of a speech recognition by recognizing the speech by using above-mentioned geometric distance since it is possible to exactly detect the shape difference between the standard pattern vector and the input pattern vector.

The above description is adaptive to any reference shape such as a rectangle including the normal distribution.

[Embodiment]

Now, referring to the drawings, an embodiment will be described.

In the embodiment, for distinguishing an abnormal sound generated by a machine from a normal sound, a standard pattern vector is produced by normalizing a frequency distribution of normal sound and an input pattern vector is produced by normalizing a frequency distribution of a sound to be monitored. Further, a difference of shape between the standard pattern vector and the input pattern vector is replaced to a difference of shape between a positive vector of a reference pattern having, as an element, a value of a normal distribution and a negative vector of a reference pattern having, as an element, the value of the normal distribution. Then, the abnormal sound is detected based on a difference of kurtosis among the positive and negative vectors, and something wrong in the machine is judged based on the difference.

FIG. 1 shows a configuration of an apparatus for detecting an abnormal sound. In FIG. 1, 1 denotes a target machine to be monitored, and 2 denotes a microphone. The microphone is set at a predetermined position near the machine 1. The microphone 2 measures a sound wave generated by the machine and outputs its signal. The signal from the microphone 2 is input to m number of band-pass filters (BPF) 3 having passbands f1~fm, that are different from each other. Then each sound wave signal, having a frequency component corresponding to each BPF 3, is extracted and given to each analog to digital converter (A/D) 4. These signals are converted at same time and periodically to digital signals, respectively, and given to a processor 5 such as a computer. The processor 5 is constructed to detect an abnormal sound based on the output signal as mentioned below. The i-th (i=1,2,3, . . . ,m) BPF 3 is set at a central frequency fi and the output signal of the i-th BPF 3 is input to an i-th A/D converter 4.

Next, a process for detecting the abnormal sound by using the measuring apparatus shown in FIG. 1 is described. While many kinds of method for extracting a power spectrum of a sound wave have been developed, in the process, a method using a group of analog BPF is employed because the method is used for a long time and a performance of the method is stable.

Figure 2:
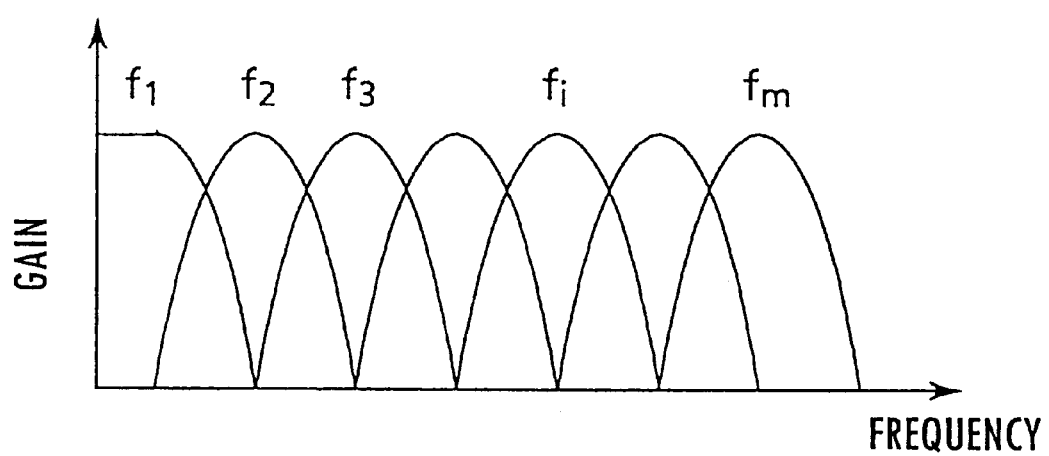
FIG. 2 shows an sample of a frequency-gain characteristics of a band pass filter in the embodiment.

In FIG. 2, which shows a characteristics of the group of BPF 3, a frequency component having a band, of which center frequency is fi, is extracted by inputting the sound wave signal into the i-th BPF. Then, by setting each BPF in this manner, it is possible to extract a feature of a frequency distribution of the sound wave.

As shown in FIG. 1, assuming that the output signal from the i-th A/D converter 4 is xi(t) (i=1,2,3, . . . ,m) as a function of time t, the function xi(t) is a frequency component of the sound wave extracted by the i-th BPF 3. Therefore, a power spectrum Pi of the i-th frequency band is calculated by the following equation 1, wherein an arbitrary time length T for calculating a sum of a square of xi(t) is set so that a change of a feature of the sound wave according to the time remarkably appears.

[Equation 1]

$$Pi = \sum_{t=0}^{T} \{xi(t)\}^2 \qquad (i = 1, 2, 3, \ldots, m) \qquad \text{equation 1}$$

In this embodiment, a normalized power spectrum is used. Namely, a tone quality is more important than a volume in a detection of an abnormal sound. In such a case, it is important to detect a change or difference of a shape of the power spectrum, and it is convenient to use the power spectrum, which is obtained by normalizing the power spectrum Pi with a total energy. The normalized power spectrum pi of the i-th frequency band is calculated by the following equation 2.

[Equation 2]

$$pi = \frac{Pi}{\sum_{j=1}^{m} Pj} \quad (i = 1, 2, 3, \ldots, m) \quad \text{equation 2}$$

Figure 3A:
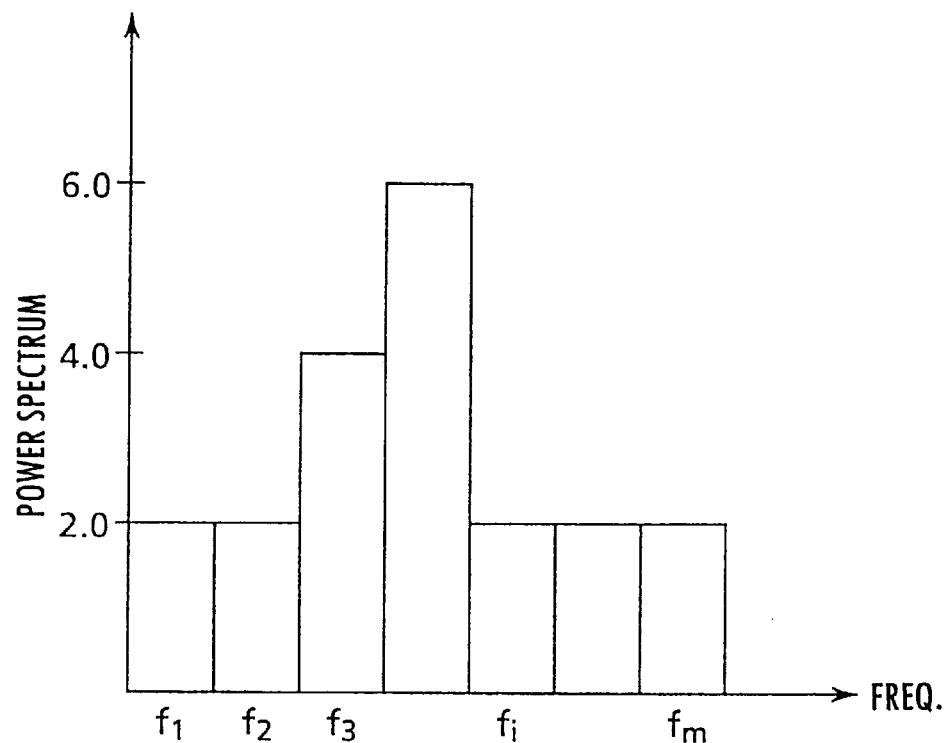
FIG. 3($a$) shows an sample of a power spectrum.
Figure 3B:
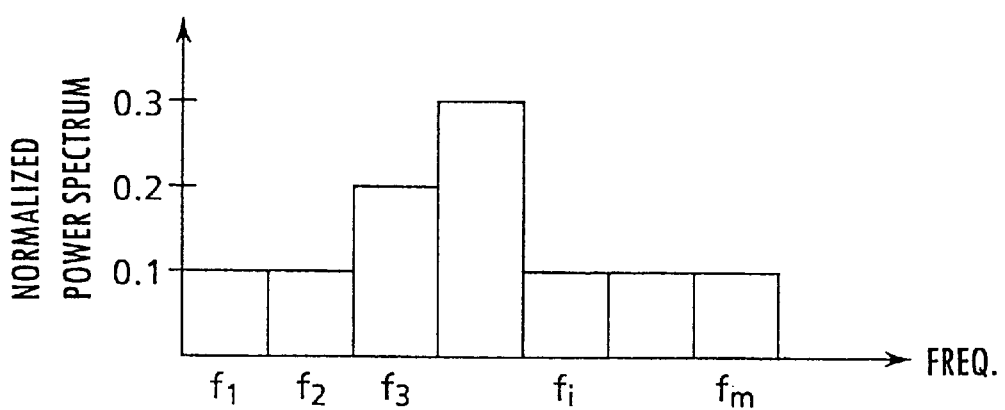

FIG. 3(a) shows the power spectrum calculated by the equation 1, and FIG. 3(b) shows the power spectrum normalized by the equation 2. It is recognized that the power spectrum and the normalized power spectrum are similar as shown in the figures.

Next, a standard pattern vector H and an input pattern vector N are produced. The standard pattern vector H has, as its element, a normalized power spectrum pi (i=1,2,3,...,m) of the normal sound and the input pattern vector N has, as its element, a normalized power spectrum pi (i=1,2,3,...,m) of the monitored sound. The standard pattern vector H and the input pattern vector N are expressed as shown in the following equation 3. The equation 3 expresses a shape of the normalized power spectrum by using m elements of a vector.

[Equation 3]

$$H=(h1,h2,\ldots,hm)$$

$$N=(n1,n2,\ldots,nm) \quad \text{equation 3}$$

The following equation 4 is a probability density function, wherein $\mu$ indicates a mean value and $\sigma^2$ indicates a variance.

[Equation 4]

$$f(y) = \frac{1}{\sigma(2\pi)^{1/2}} \exp\left\{-\frac{1}{2}\left(\frac{y-\mu}{\sigma}\right)^2\right\} \quad \text{equation 4}$$

Figure 4A:
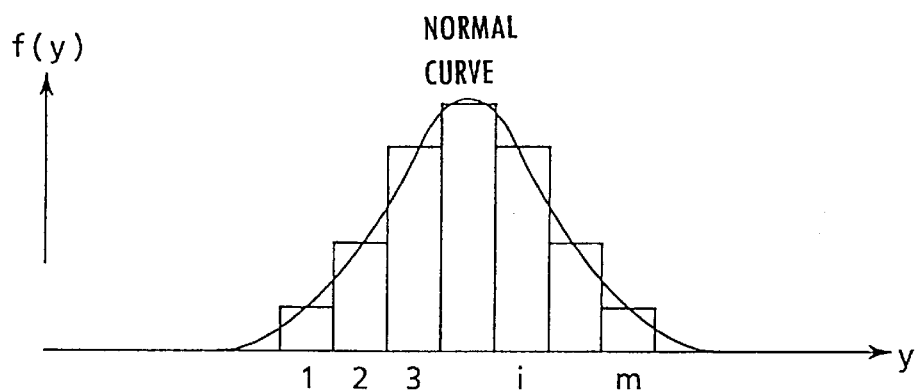
FIG. 4($a$) shows a normal curve.

FIG. 4(a) shows a graph of the normal distribution (a normal curve) expressed by the equation 4 and also shows a bar graph of which height is equal to the function value of the normal curve.

Figure 4B:
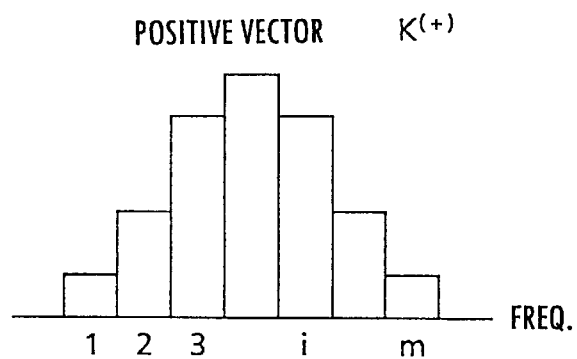
Figure 4C:
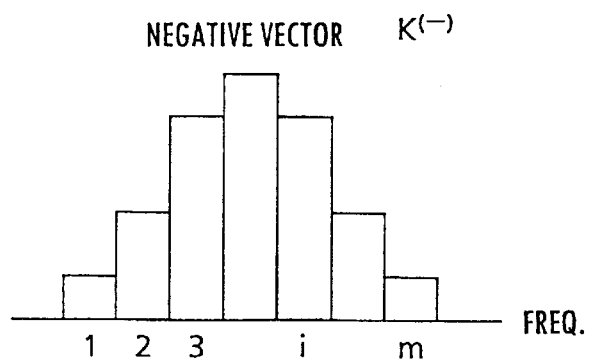

FIG. 4(b) shows a positive vector $K^{(+)}$ of a reference pattern having, as its element, a height value of the bar graph, and FIG. 4(c) shows a negative vector $K^{(-)}$ of the reference pattern having, as its element, a height value of the bar graph. These vectors $K^{(+)}$ and $K^{(-)}$ are expressed by the following equation 5. The equation 5 expresses a shape of the normal distribution by using m elements of a vector. The equation 3 and the equation 5 have a same dimension.

[Equation 5]

$$K^{(+)}=(k^{(+)}_1, k^{(+)}_2, \ldots, k^{(+)}_m)$$

$$K^{(-)}=(k^{(-)}_1, k^{(-)}_2, \ldots, k^{(-)}_m) \quad \text{equation 5}$$

It is recognized from FIG. 4 that one pair of the reference pattern vectors $K^{(+)}$ and $K^{(-)}$ are originally same vectors.

It is possible to set the mean value $\mu$ and the variance $\sigma^2$ in arbitrary ranges which enable to express a feature of the normal distribution by m elements. In this embodiment, it is assumed that the mean value is a center of all elements of the reference pattern vector and the variance is equal to 1.

Further, while in this embodiment the number m is an odd number, same discussion holds in case of m being an even number.

Next, a shape change or difference between the standard pattern vector H and the input pattern vector N is replaced to a shape change or difference between the positive reference pattern vector $K^{(+)}$ and the negative reference pattern vector $K^{(-)}$.

Namely, an attention is paid to that regarding the i-th (i=1,2,3,...,m) element of the vector, an absolute value |ni−hi| of the difference between the element hi of the standard pattern vector H and the element ni of the input pattern vector N.

Then, as shown in the following equation 6, the element $k^{(+)}_i$ of the positive reference pattern vector $K^{(+)}$ is increased by the absolute value |ni−hi| when the element ni of the input pattern vector N is greater than the element hi of the standard pattern vector H. When the element ni of the input pattern vector N is less than the element hi of the standard pattern vector H, the element $k^{(-)}_i$ of the negative reference pattern vector $K^{(-)}$ is increased by the absolute value |ni−hi|.

[Equation 6]

When $i=1,2,3,\ldots,m$;

if $ni>hi$, $k^{(+)}_i$ is increased by |ni−hi|, if $ni<hi$, $k^{(-)}_i$ is increased by |ni−hi|.      equation 6

Referring to FIGS. 5~9, the equation 6 is described. FIGS. 5~9 express the m elements of the vector as a shape of the vector by the graph. In the case where a power spectrum of only one frequency band out of all frequency bands is increased based on the equation 2, a power spectrum of each of other frequency bands is relatively decreased according to the increase of the power spectrum of above-mentioned one frequency band. However, in FIGS. 5~9, an increase or a decrease is indicated only at an element to be noticed of the vector and any changes of other elements are not indicated for simplicity and easy understanding.

Further, while each element of a negative reference pattern vector is not negative, a shape of the negative vector is indicated upside down for easily comparing a shape of a positive reference pattern vector.

Description of FIGS. 5~9 is as follows.

Figure 5A:
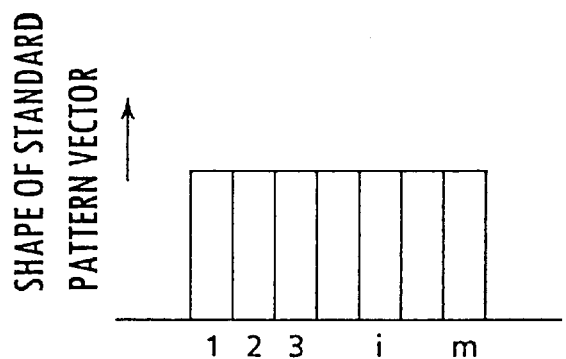
FIG. 5($a$) shows a typical sample of a shape of a standard pattern vector.
Figure 5B:
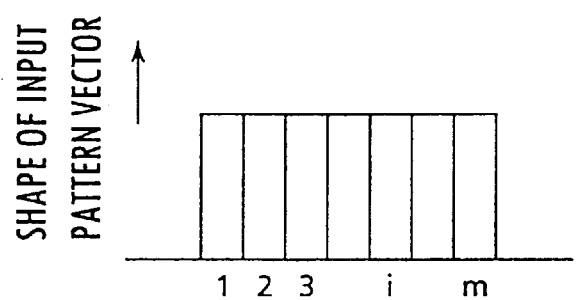
Figure 5C:
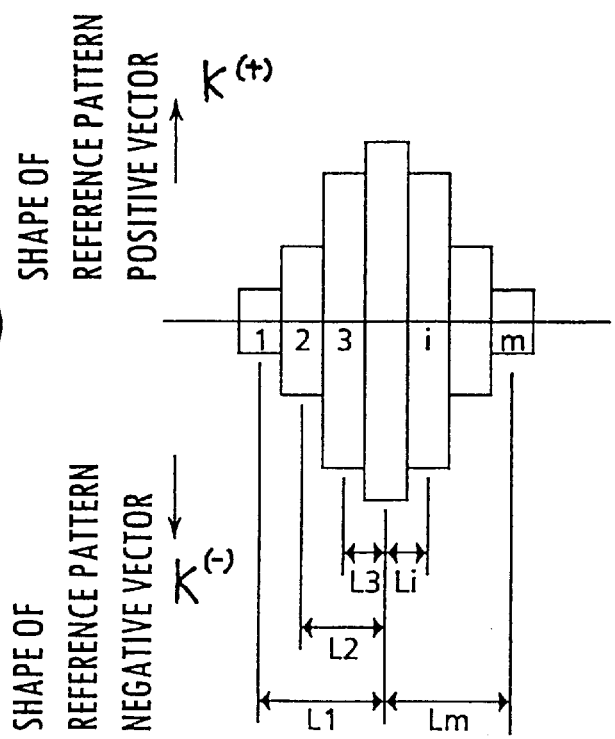

(1) FIGS. 5(a)~5(c) show a case where a shape of an input pattern vector is equal to a shape of a standard pattern vector. In this case, the positive reference pattern vector and the negative reference pattern vector are same shape of a normal distribution.

Figure 6A:
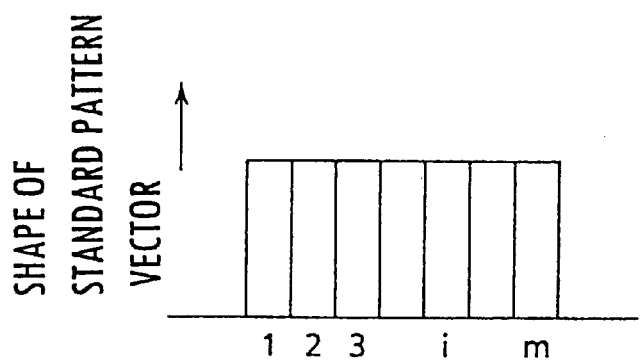
FIG. 6($a$) shows a shape of a same standard pattern vector shown in FIG. 5($a$)
Figure 6B:
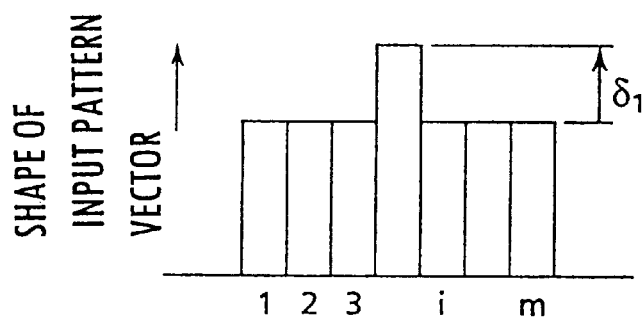
Figure 6C:
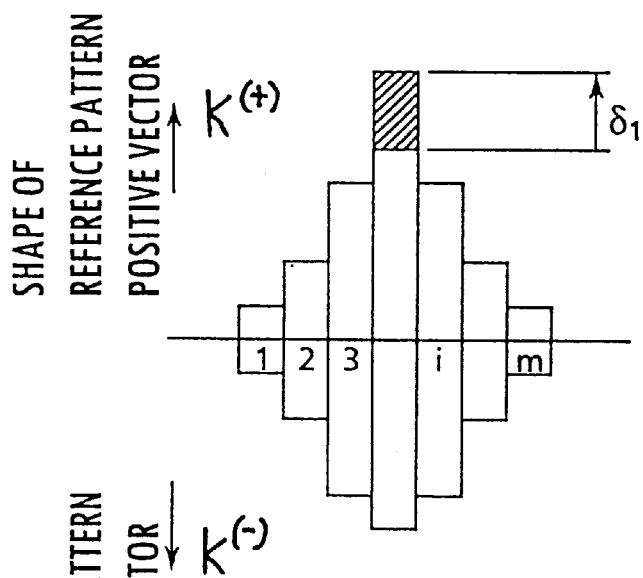

(2) FIGS. 6(a)~6(c) show a case where a center part of a shape of an input pattern vector is increased by δ1 than a shape of a standard pattern vector. In this case, a part with oblique lines in the positive reference pattern vector is increased by δ1 but the shape of the negative reference pattern vector is not changed.

Figure 7A:
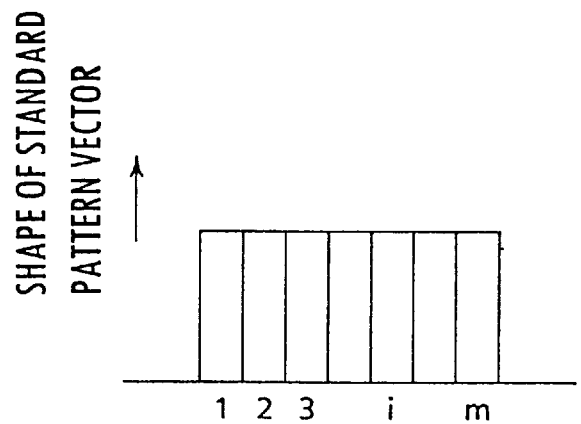
FIG. 7($a$) shows a shape of a same standard pattern vector shown in FIG. 5($a$)
Figure 7B:
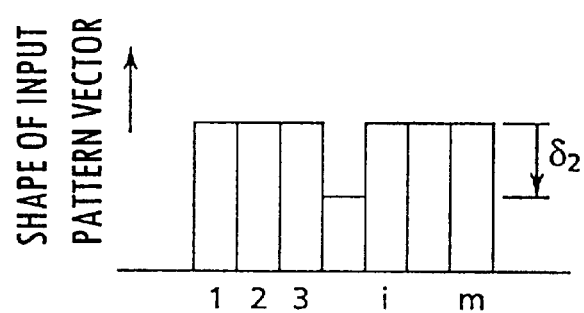
Figure 7C:
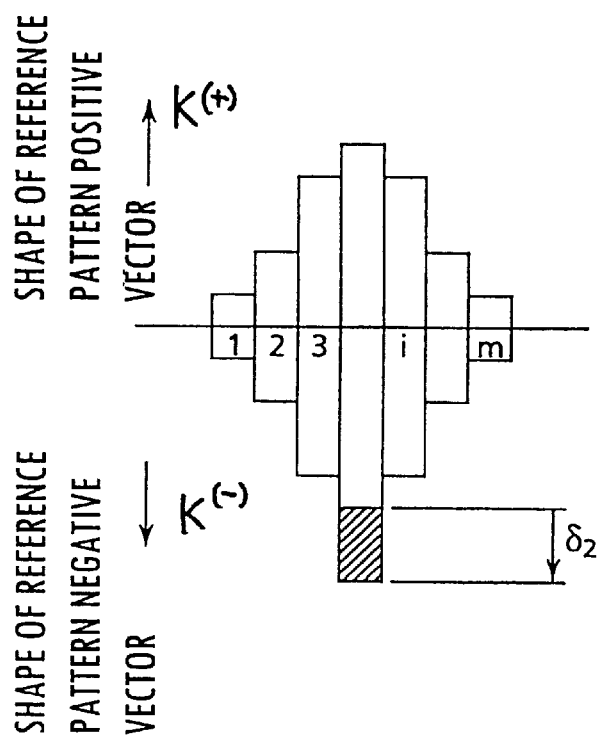

(3) FIGS. 7(a)~7(c) show a case where a center part of a shape of an input pattern vector is decreased by δ2 than a shape of a standard pattern vector. In this case, a part with oblique lines in the negative reference pattern vector is increased by δ2 but the shape of the positive reference pattern vector is not changed.

Figure 8A:
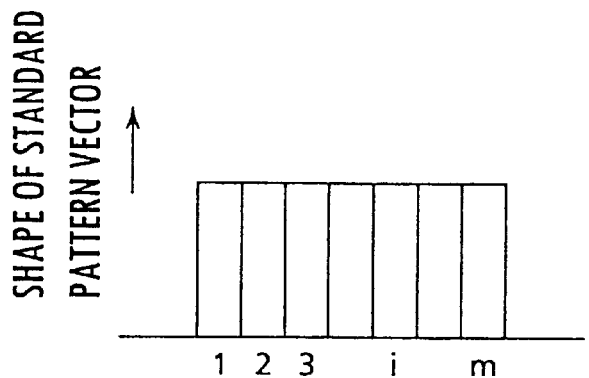
FIG. 8($a$) shows a shape of a same standard pattern vector shown in FIG. 5($a$)
Figure 8B:
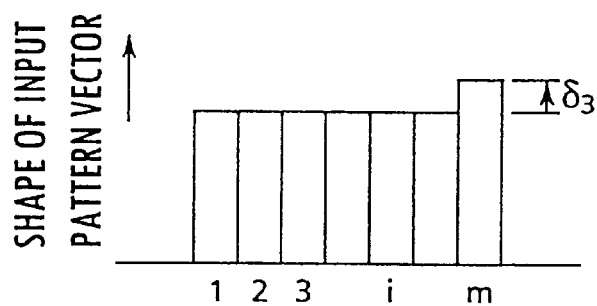
Figure 8C:
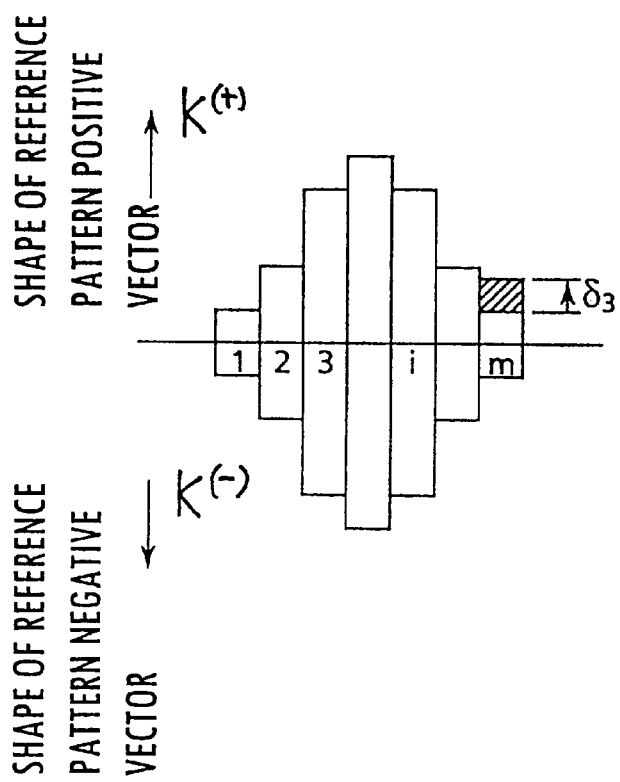

(4) FIGS. 8(a)~8(c) show a case where an edge part of a shape of an input pattern vector is increased by δ3 than a shape of a standard pattern vector. In this case, a part with oblique lines in the positive reference pattern vector is increased by δ3 but the shape of the negative reference pattern vector is not changed.

Figure 9A:
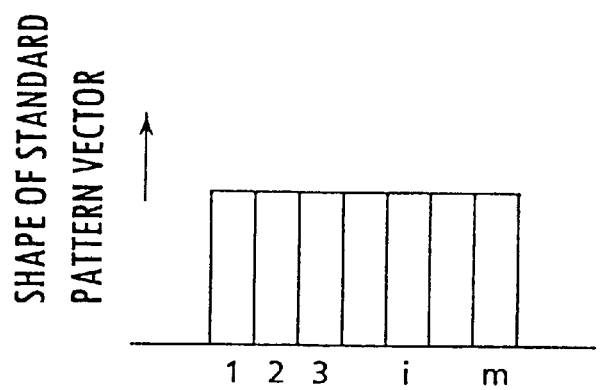
FIG. 9($a$) shows a shape of a same standard pattern vector shown in FIG. 5($a$)
Figure 9B:
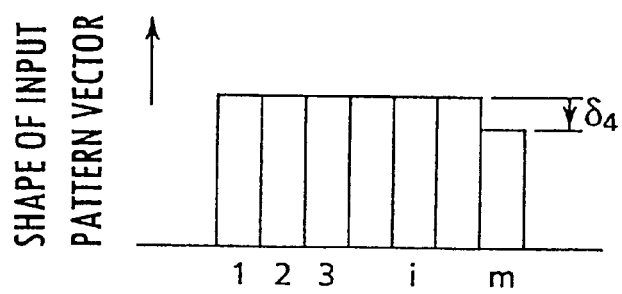
Figure 9C:
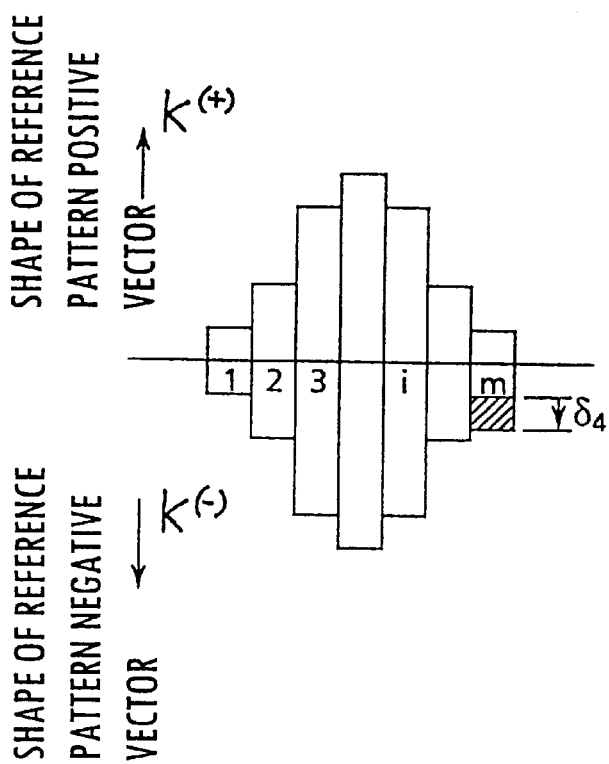

(5) FIGS. 9(a)~9(c) show a case where an edge part of a shape of an input pattern vector is decreased by δ4 than a shape of a standard pattern vector. In this case, a part with oblique lines in the negative reference pattern vector is increased by δ4 but the shape of the positive reference pattern vector is not changed.

While FIGS. 5~9 show a typical sample indicating shapes of the standard pattern vector and the input pattern vector, in general, almost all parts of the input pattern vector are changed from the shape of the standard pattern vector, and the equation 6 is executed to calculate every shape change in all changed parts. The equation 6 is adaptive to any arbitrary standard pattern vector and any arbitrary input pattern vector because of obtaining a relative shape change instead of an absolute shape change.

Next, with regard to one pair of the positive reference pattern vector $K^{(+)}$ and the negative reference pattern vector $K^{(-)}$, Respectively changed by the equation 6, a size of the shape change is evaluated as a change of "kurtosis."

By the following equation 7, a kurtosis $A^{(+)}$ of the positive reference pattern vector $K^{(+)}$ and a kurtosis $A^{(-)}$ of the negative reference pattern vector $K^{(-)}$, respectively, can be calculated. As shown in FIGS. 5(a)~5(c), Li (i=1,2,3,...,m) in the equation 7 is a deviation from the mean value of the normal distribution, wherein the deviation Li is set in arbitrary range which enable to express a feature of the normal distributions.

[Equation 7]

$$A^{(+)} = \frac{\left\{\sum_{i=1}^{m} k_i^{(+)}\right\} \cdot \left\{\sum_{i=1}^{m} (Li)^4 \cdot k_i^{(+)}\right\}}{\left\{\sum_{i=1}^{m} (Li)^2 \cdot k_i^{(+)}\right\}^2}$$

$$A^{(-)} = \frac{\left\{\sum_{i=1}^{m} k_i^{(-)}\right\} \cdot \left\{\sum_{i=1}^{m} (Li)^4 \cdot k_i^{(-)}\right\}}{\left\{\sum_{i=1}^{m} (Li)^2 \cdot k_i^{(-)}\right\}^2}$$

equation 7

The kurtosis $A^{(+)}$ and the kurtosis $A^{(-)}$ are ratios of a biquadratic moment around the mean value of the normal distribution to a square of a quadratic moment around the mean value of the normal distribution.

It is possible to calculate a kurtosis value of the normal distribution and any arbitrary reference shape.

As mentioned above, generally, it is impossible to determine a negative element of a vector in an equation for calculating the kurtosis of the vector. Namely, it is necessary that each element of the reference vector is not a negative value in any relation of great and small sizes between the standard pattern vector and the input pattern vector.

For satisfying said condition, the positive reference pattern vector $K^{(+)}$ and the negative reference pattern vector $K^{(-)}$ are produced, wherein an initial value of the positive vector $K^{(+)}$ is equal to an initial value of the negative vector $K^{(-)}$. The equation 6 changes some elements of those vectors $K^{(+)}$ and $K^{(-)}$ but does not decrease any element value of those vectors $K^{(+)}$ and $K^{(-)}$. In the equation 7, the kurtosis $A^{(+)}$ and the kurtosis $A^{(-)}$ of those vectors $K^{(+)}$ and $K^{(-)}$ are calculated.

Next, from a change of the kurtosis $A^{(+)}$ of the positive reference pattern vector $K^{(+)}$ and the kurtosis $A^{(-)}$ of the negative reference pattern vector $K^{(-)}$, a difference or a change D of the shape is calculated by using a difference $(A^{(+)}-A^{(-)})$ between the kurtosis $A^{(+)}$ and the kurtosis $A^{(-)}$, wherein the difference or a change D represents a similarity between the standard pattern vector and the input pattern vector.

For example, a value of the kurtosis $A^{(+)}$ of the reference pattern vector $K^{(+)}$ initially produced by the equation 5, is equal to 3 and a value of the kurtosis $A^{(-)}$ of the reference pattern vector $K^{(-)}$ initially produced by the equation 5, is equal to 3. Therefore, a change of the kurtosis of the reference pattern vector $K^{(+)}$ changed by the equation 6 is equal to $\{A^{(+)}-3\}$ and a change of the kurtosis of the reference pattern vector $K^{(-)}$ changed by the equation 6 is equal to $\{A^{(-)}-3\}$. Namely, a change in a positive direction is $\{A^{(+)}-3\}$ and a change in a negative direction is $\{A^{(-)}-3\}$. Then overall change is a difference between $\{A^{(+)}-3\}-\{A^{(-)}-3\}$. By the following equation 8, the value D indicating the overall shape change is calculated.

[Equation 8]

$$D=\{A^{(+)}-3\}-\{A^{(-)}-3\}$$
$$=A^{(+)}=A^{(-)}$$

equation 8

Next, with regard to the typical sample of the standard pattern vector and the input pattern vector, the value D calculated by the equation 8 is considered.

(1) As shown in FIGS. 5(a)~5(c), in a case where the shape of the input pattern vector is equal to the shape of the standard pattern vector, $A^{(+)}=3$ and $A^{(-)}=3$, then the shape change value D=0.

(2) As shown in FIGS. 6(a)~6(c), in a case where the center part of the shape of the input pattern vector is increased, $A^{(+)}>3$ and $A^{(-)}=3$, then the shape change value D>0.

(3) As shown in FIGS. 7(a)~7(c), in a case where the center part of the shape of the input pattern vector is decreased, $A^{(+)}=3$ and $A^{(-)}>3$, then the shape change value D<0.

(4) As shown in FIGS. 8(a)~8(c), in a case where the edge part of the shape of the input pattern vector is increased, $A^{(+)}<3$ and $A^{(-)}=3$, then the shape change value D<0.

(5) As, shown in FIGS. 9(a)~9(c), in a case where the edge part of the shape of the input pattern vector is decreased, $A^{(+)}=3$ and $A^{(-)}<3$, then the shape change value D>0.

Namely, when the normalized power spectrum of the monitored sound is relatively strong than the normalized power spectrum of the normal sound in a frequency band near the center of the normal distribution, the shape change value D is positive and increases according to the relative strength. Inversely, when the normalized power spectrum of the monitored sound is relatively weak than the normalized power spectrum of the normal sound in a frequency band near the center of the normal distribution, the shape change value D is negative and decreases according to the relative strength.

Figure 10A:
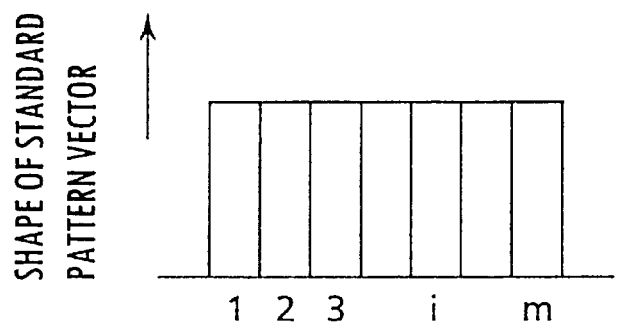
FIG. 10($a$) shows a shape of a standard pattern vector.
Figure 10B:
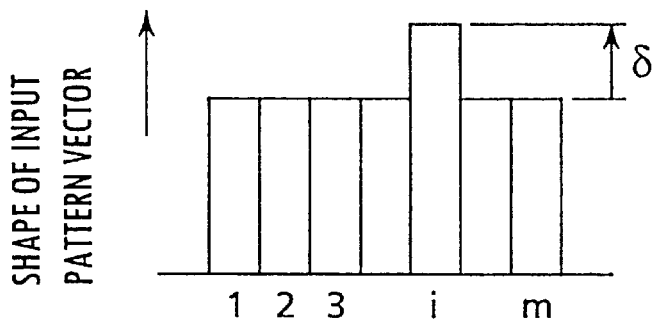
Figure 11:
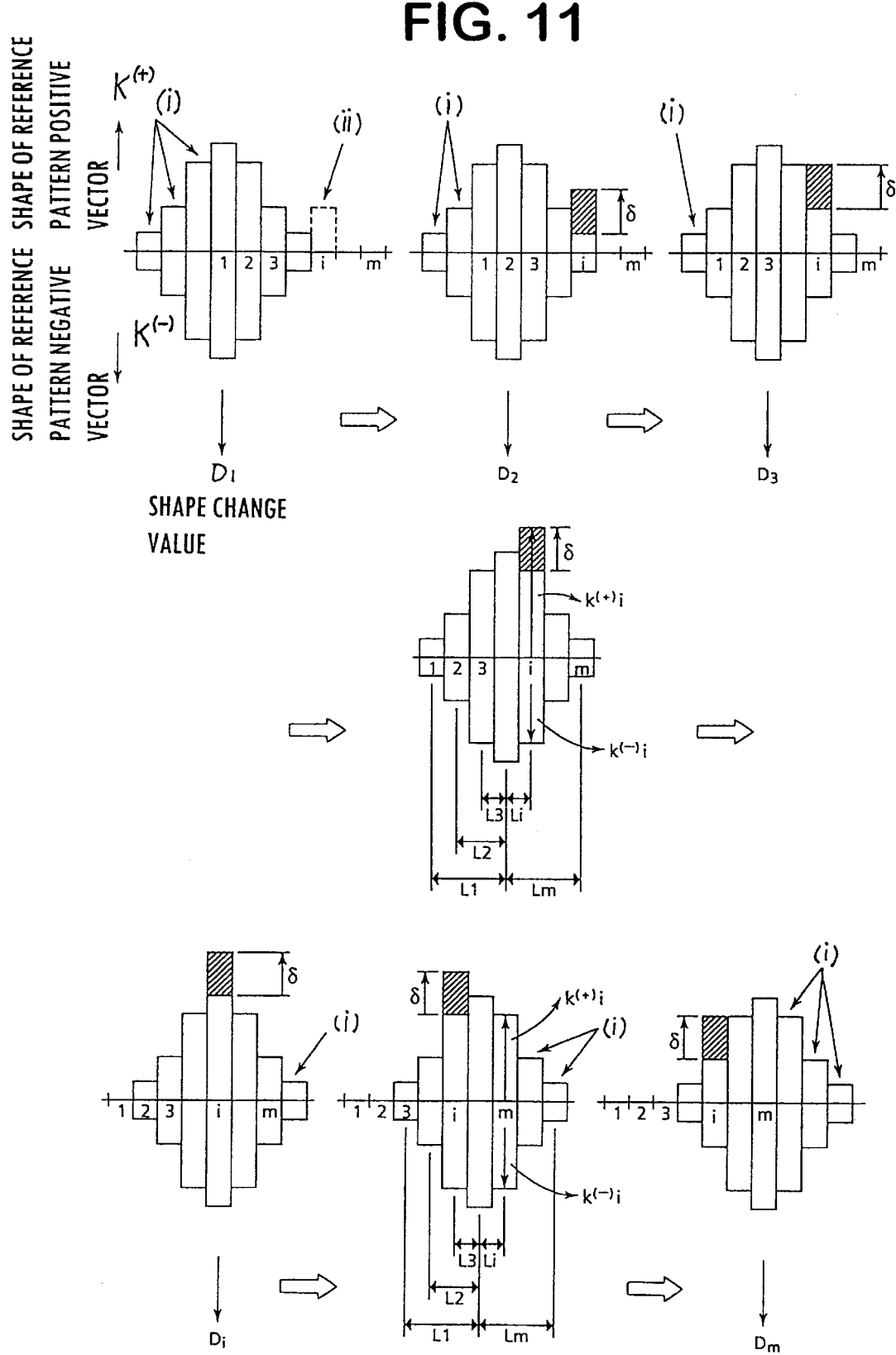
FIG. 11 shows a sample of a shape change in a positive and a negative vectors according to a movement of a mean value of a normal distribution.

Next, the shape change value D is calculated at each position of the element of the standard pattern vector to which the mean value of the normal distribution is sequentially moved. FIGS. 10(a) and 10(b) show a sample of a shape of an input pattern vector, of which i-th element is increased than the standard pattern vector. FIG. 11 shows a sample of a shape change in positive and negative vectors when a mean value of the normal distribution moves to j-th element (j=1,2,3,...,m) of the standard pattern vector in the sample shown in FIGS. 10(a) and 10(b).

While i-th element of the input pattern vector is increased by δ than the standard pattern vector in FIGS. 10(a) and 10(b), a corresponding part with oblique lines in the positive reference pattern vector is only increased by δ but the shape of the negative reference pattern vector is not changed.

Further, in a case that the mean value of the normal distribution is off from the center of the standard pattern vector, a value of a part indicated by (i) in FIG. 11 is never changed because this part does not correspond to the element number (i=1,2,3, . . . ,m). Further, a value of a part indicated by (ii) in FIG. 11 is never changed in spite of the change indicated by dotted line because this part is outside the range of the positive vector and the negative vector.

By above-mentioned manner, in each case where the mean value of the normal distribution is sequentially moved to j-th element (j=1,2,3, . . . ,m) of the standard pattern vector, a shape change value Dj is calculated by sequentially using the equation 6, the equation 7, and the equation 8 as shown in FIG. 11. In FIG. 11, a value Li (i=1,2,3, . . . ,m) in the equation 7 indicates a deviation from the mean value of the moved normal distribution. Further, $k^{(+)}_i$ and $k^{(-)}_i$ correspond to the value Li.

The movement of the center of the normal distribution is a relattive movement to the standard pattern vector and the input pattern vector. Therefore, in practice of calculation, it is possible to move the shape of the standard pattern vector and the shape of the input pattern vector to the shape of the reference pattern vector instead of moving the shape of the reference pattern vector to the shape of the standard pattern vector and the shape of the input pattern vector.

In the case where the shape of the standard pattern vector and the shape of the input pattern vector are moved to the shape of the reference pattern vector, a calculation of the shape change value Di is described. Since the number m is an odd number in this embodiment, by using the following equation 9 instead of the equation 6, it is possible to change the reference positive vector $K^{(+)}=(k^{(+)}_1, k^{(+)}_2, \ldots, k^{(+)}_m)$ and the reference negative vector $K^{(-)}=(k^{(-)}_1, k^{(-)}_2, \ldots, k^{(-)}_m)$ Further, by using the changed vectors $K^{(+)}$ and $K^{(-)}$, it is possible to calculate the shape change value Dj corresponding to the movement of the mean value of the normal distribution to the position of j-th element of the standard pattern vector.

[Equation 9]

When $1 \leq i-j+(m+1)/2 < m$ is satisfied in $i=1,2,3, \ldots, m$;

if $ni > hi$, $k^{(+)}_{i-j+(m+1)/2}$ is increased by $|ni-hi|$, if $ni < hi$, $k^{(-)}_{i-j+(m+1)/2}$ is increased by $|ni'hi|$.

Figure 12:
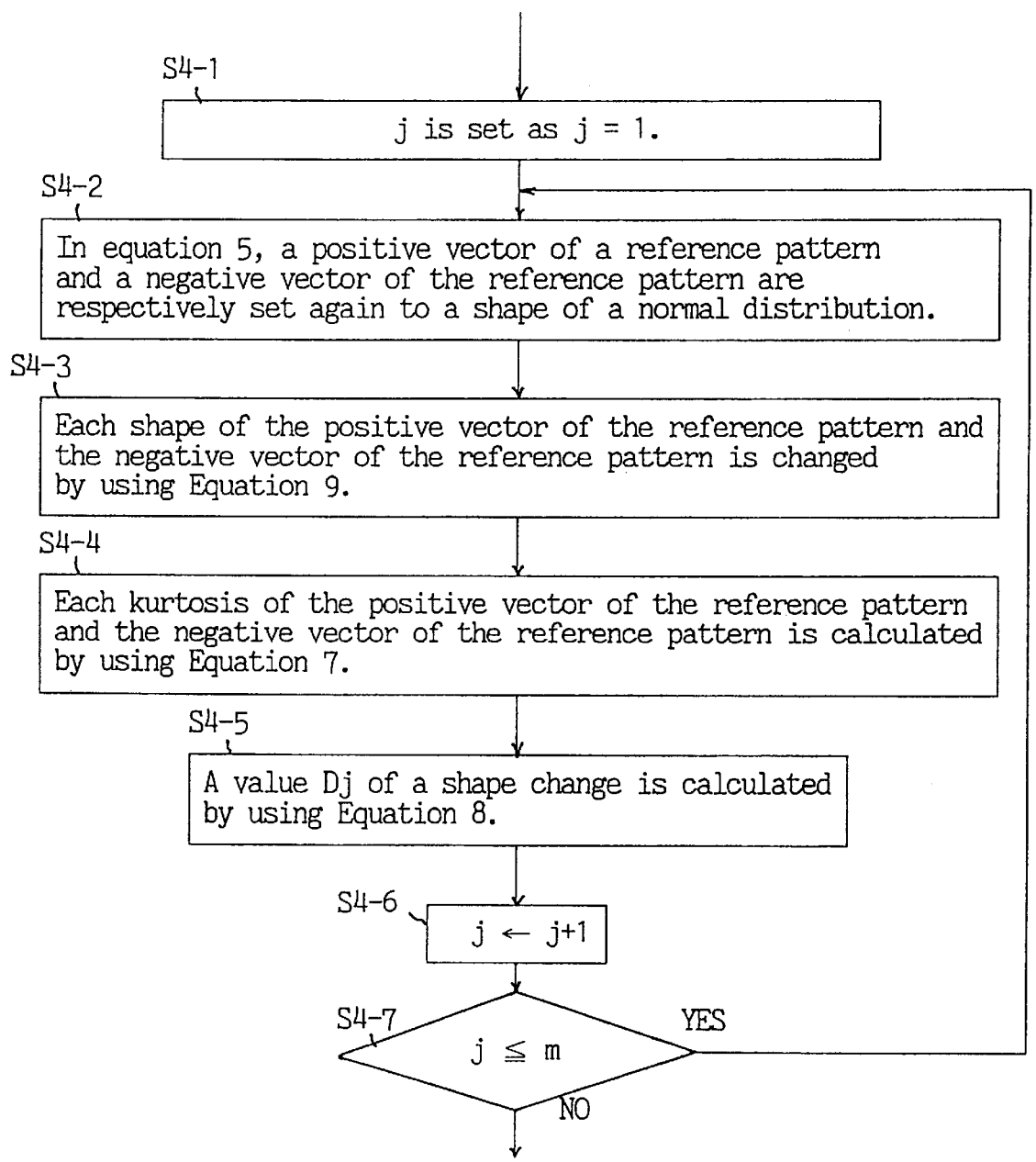
FIG. 12 shows a flow chart for calculating a value of a shape change (a difference between a kurtosis of a positive vector and a kurtosis of a negative vector)

FIG. 12 shows a flow chart for calculating m pieces of values Dj (j=1,2,3, . . . ,m). In this case, the standard pattern vector H and the input pattern vector N are previously produced by using equation 3, and the reference positive vector $K^{(+)}$ and the reference negative vector $K^{(-)}$ are previously produced by using equation 5. The flow chart shows a process after producing $K^{(+)}$ and $K^{(-)}$. It also shows a detail of step S4 in FIG. 15.

In FIG. 12, in step S4-1, j is set to an initial value "1." In the next steps from S4-2 to S4-7, the loop for calculating the shape change Dj starts by j being increased to j=m.

In step S4-2, one pair of the positive reference pattern vector $K^{(+)}$ and the negative reference pattern vector $K^{(-)}$ are reset to the shape of the normal distribution by equation 5. In steps S4-3 to S4-5, the shape change value Dj is calculated by sequentially using equation 9, equation 7, and equation 8. Namely, in step S4-3, each shape of the positive reference pattern vector $K^{(+)}$ and the negative reference pattern vector $K^{(-)}$ is changed by using equation 9. In step S4-4, the kurtosis $A^{(+)}$ of the positive reference pattern vector $K^{(+)}$ and the kurtosis $A^{(-)}$ of the negative reference pattern vector $K^{(-)}$ are calculated by using equation 7. In step S4-5, the shape change value Dj is calculated by using equation 8. Instead of producing m pairs of the reference positive pattern vector and the reference negative pattern vector in every case respectively corresponding to the element number j (j=1,2,3, . . . ,m), it is possible to calculate m pieces of the shape change value Dj only by producing one pair of the reference positive pattern vector and the reference negative pattern vector according to the above-mentioned process.

Figure 13:
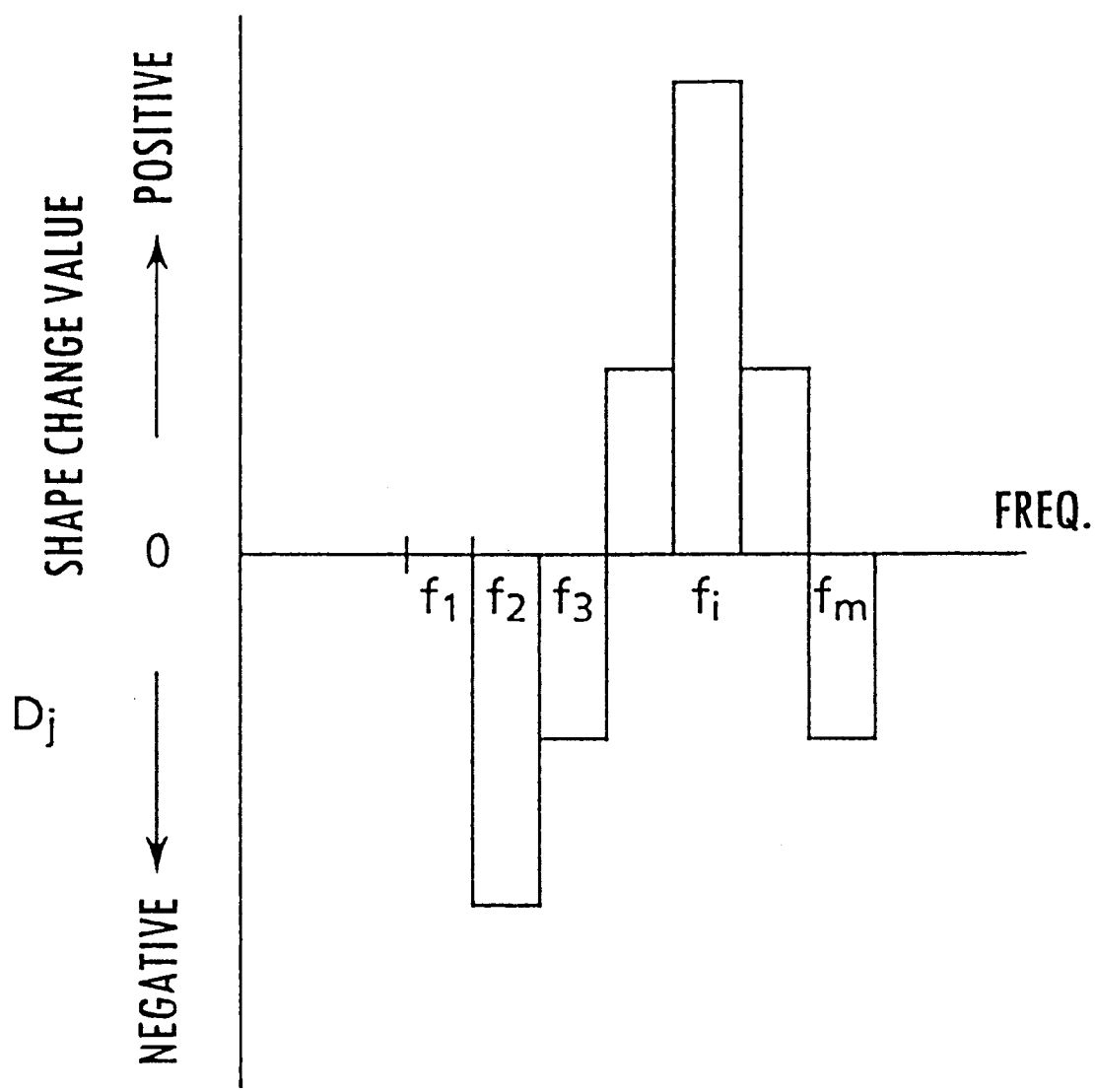
FIG. 13 shows a value of a geometrical change at every frequency band.

FIG. 13 shows a value Dj of a shape change of the standard pattern vector and the input pattern vector shown in FIGS. 10 and 11. The value Dj was calculated at every frequency band by using the process shown in FIG. 12.

When the mean value of the normal distribution moves to a position at which the input pattern vector is increased than the standard pattern vector, as shown in FIG. 13, the value of the shape change becomes maximum (see frequency band fi in FIG. 13). When the mean value of the normal distribution moves to a position which is off from the increased part, the value of the shape change becomes minus. When the mean value of the normal distribution moves to a position which is further off, since a part indicated by (ii) in FIG. 11 occurs, the value of the shape change becomes 0 (see frequency band fl in FIG. 13).

As mentioned above, in the case where a center of the reference shape moves to the position at which the input pattern vector is increased than the standard pattern vector, the value Dj of the shape change or the difference value $(A^{(+)} - A^{(-)})$ becomes large.

Therefore, it is possible to detect, as the shape change, a frequency band at which the normalized power spectrum of the monitored sound is stronger than the normalized power spectrum of the normal sound and a level by which the normalized power spectrum of the monitored sound is stronger than the normalized power spectrum of the normal sound.

Next, a difference between the standard pattern vector and the input pattern vector is evaluated, as one value of the geometrical distance among two vectors, by using the m pieces of the shape change Dj(j=1,2,3, . . . ,m) described above.

It is assumed that the value of the geometrical distance is a sum of m pieces of the shape change value Dj, then the value d of the geometrical distance can be calculated by using the following equation 10. In equation 10, the geometric distance d is obtained by calculating a square root of a value which is a sum of a square of each shape change value Dj.

[Equation 10]

$$d = \left\{ \sum_{j=1}^{m} (Dj)^2 \right\}^{1/2} \qquad \text{equation 10}$$

It is possible to obtain the geometric distance by the following equation 11. The equation obtains the value of geometric distance d by calculating a sum of a square of each shape change value Dj.

[Equation 11]

$$d = \sum_{j=1}^{m} (Dj)^2 \qquad \text{equation 11}$$

Figure 17:
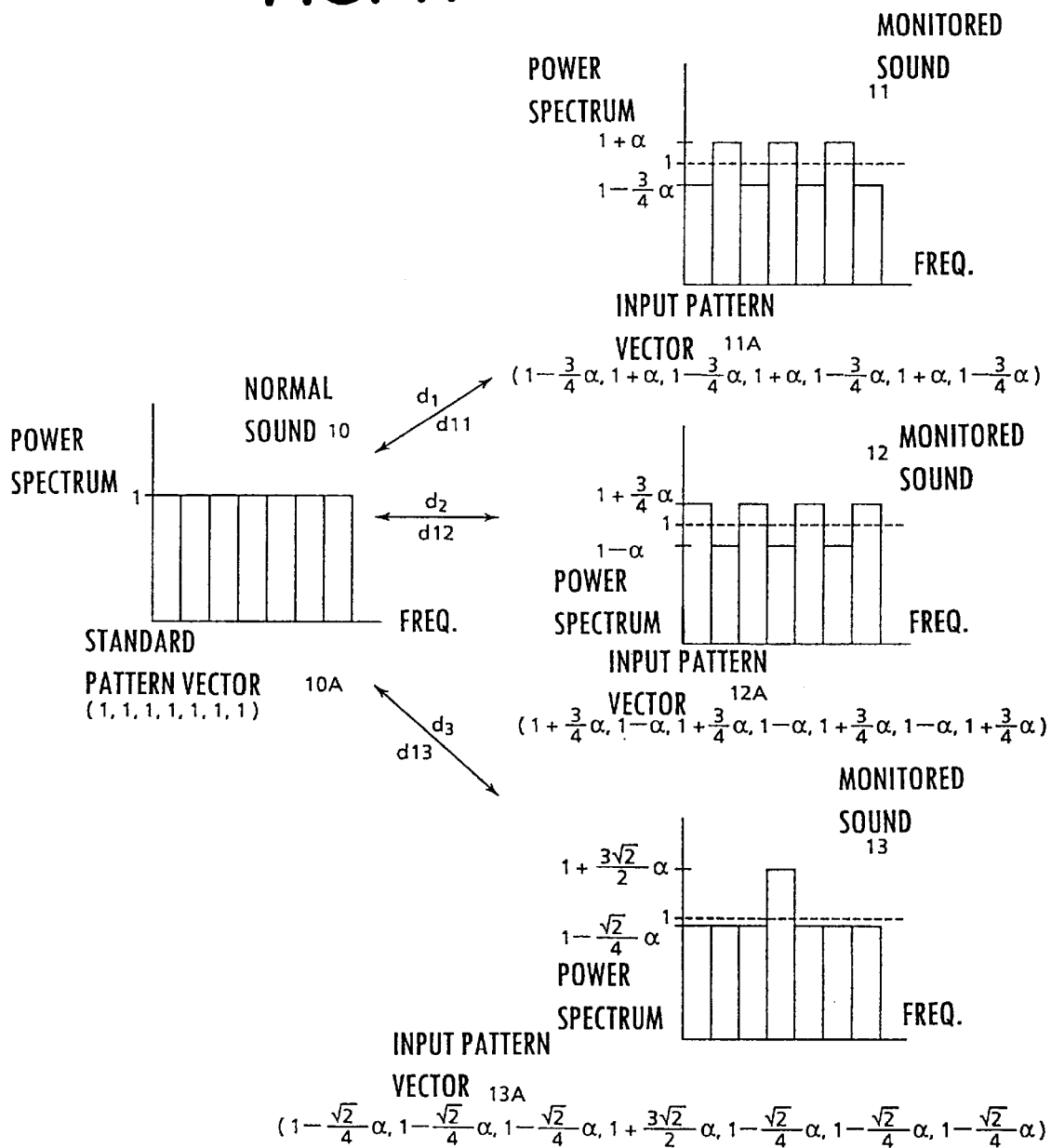
FIG. 17 shows a sample of a power spectrum of a normal sound and a sample of a power spectrum of an abnormal sound.

Next, with regard to the normal sound 10 and monitored sound 11~13 shown in FIG. 17, three pieces of the value d1, d2, d3 of the geometrical distance between the standard pattern vector 10A and each of the input pattern vectors 11A, 12A, 13A are calculated by using above mentioned process.

Figure 14:
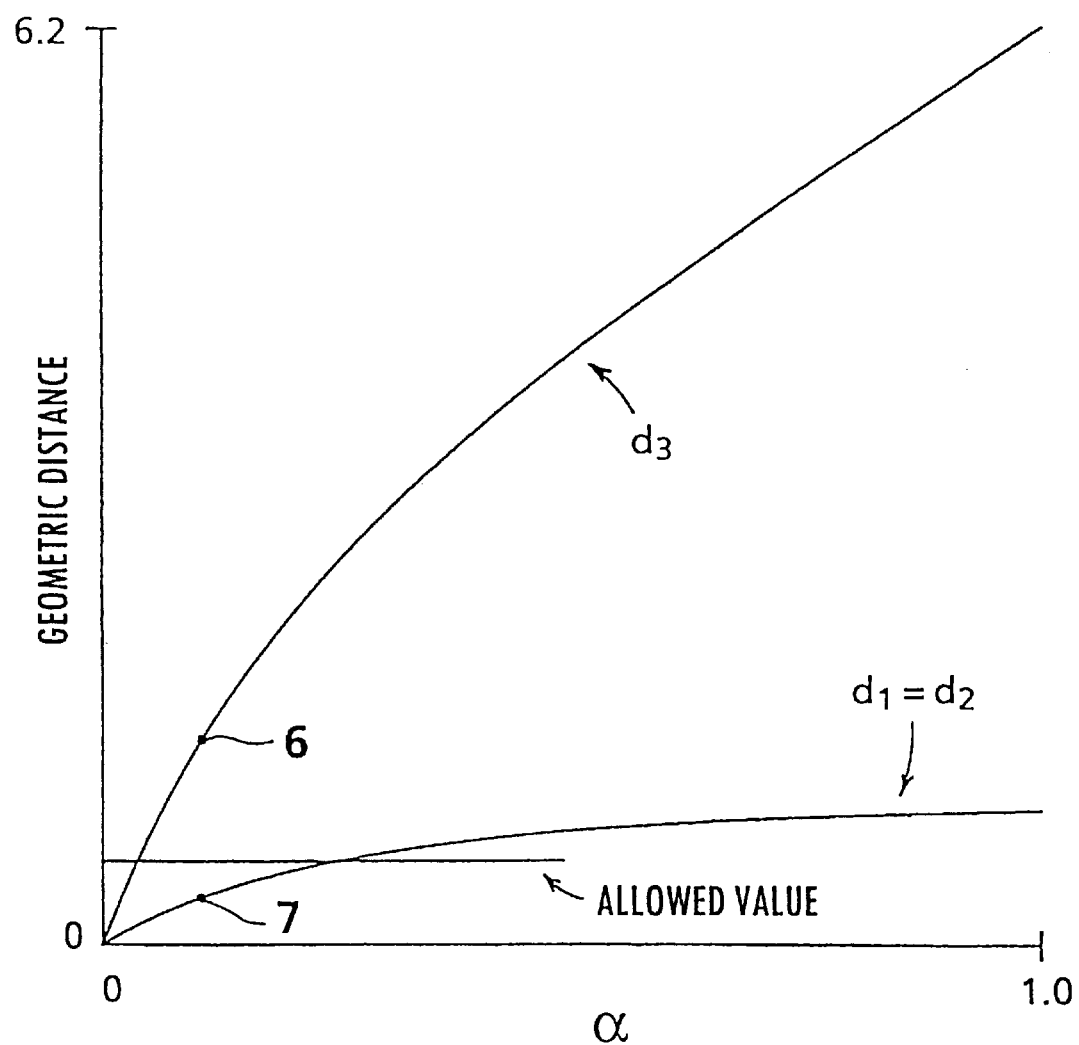
FIG. 14 shows a change of a geometric distance between a standard pattern vector and an input pattern vector according to a parameter a shown in FIG. 17.

FIG. 14 shows a change of the geometric distance values d1, d2 and d3 when the parameter a in FIG. 17 is increased from 0 to 1. In the case of FIG. 17, it is understood from FIG. 14 that a relationship of the geometric distance values d1, d2 and d3 is always d1=d2<d3, and the geometric distance values d1, d2 and d3 are increased according to an increase of the parameter a.

In FIG. 17, in a case where the parameter a is small, it is assumed that the sounds 11, 12 are "sway" sounds, which have slightly swayed from the normal sound 10, and that the sounds 13 is an abnormal sound based on a small leak of a steam etc.

Figure 18:
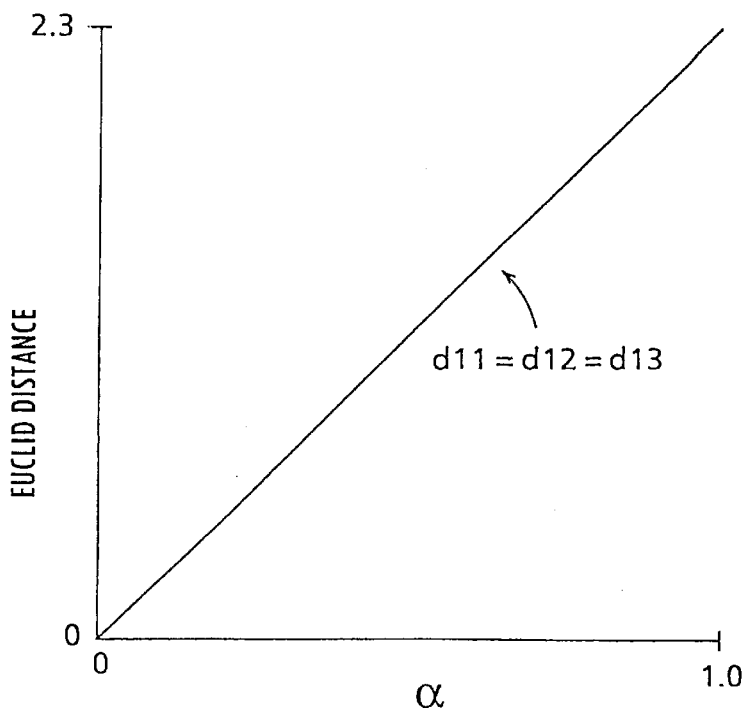
FIG. 18 shows, as a prior art, a change of an Euclid distance between vectors according to a parameter a shown in FIG. 17.
Figure 19:
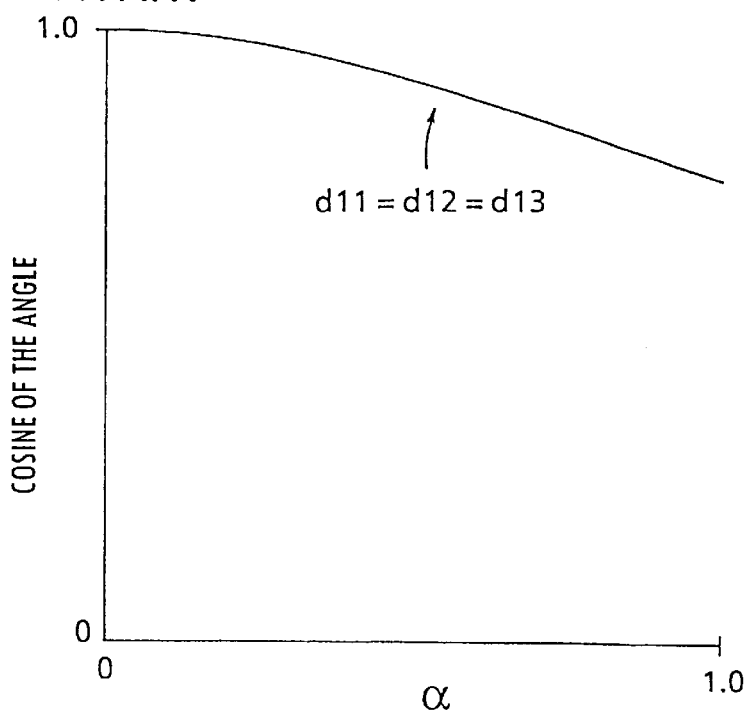
FIG. 19 shows, as a prior art, a change of a cosine of an angle between vectors according to a parameter a shown in FIG. 17.

In the prior art, when the parameter a is the same, as shown in FIGS. 18 and 19, it is impossible to distinguish the three sounds 11, 12, 13 by using the Euclid distance or the angle from the normal sound 10.

However, in the present invention, even if the parameter a is the same among the monitored sounds 11~13, by comparing the value of the geometric distance d1, d2, d3 from the normal sound with an arbitrary determined allowed value as shown in FIG. 14, it is possible to judge whether a sound indicated by a black mark 6 is an abnormal sound and a sound indicated by a black mark 7 is a normal sound. Therefore, it is possible to distinguish the monitored normal sounds 11, 12 and the monitored abnormal sound 13.

Figure 15:
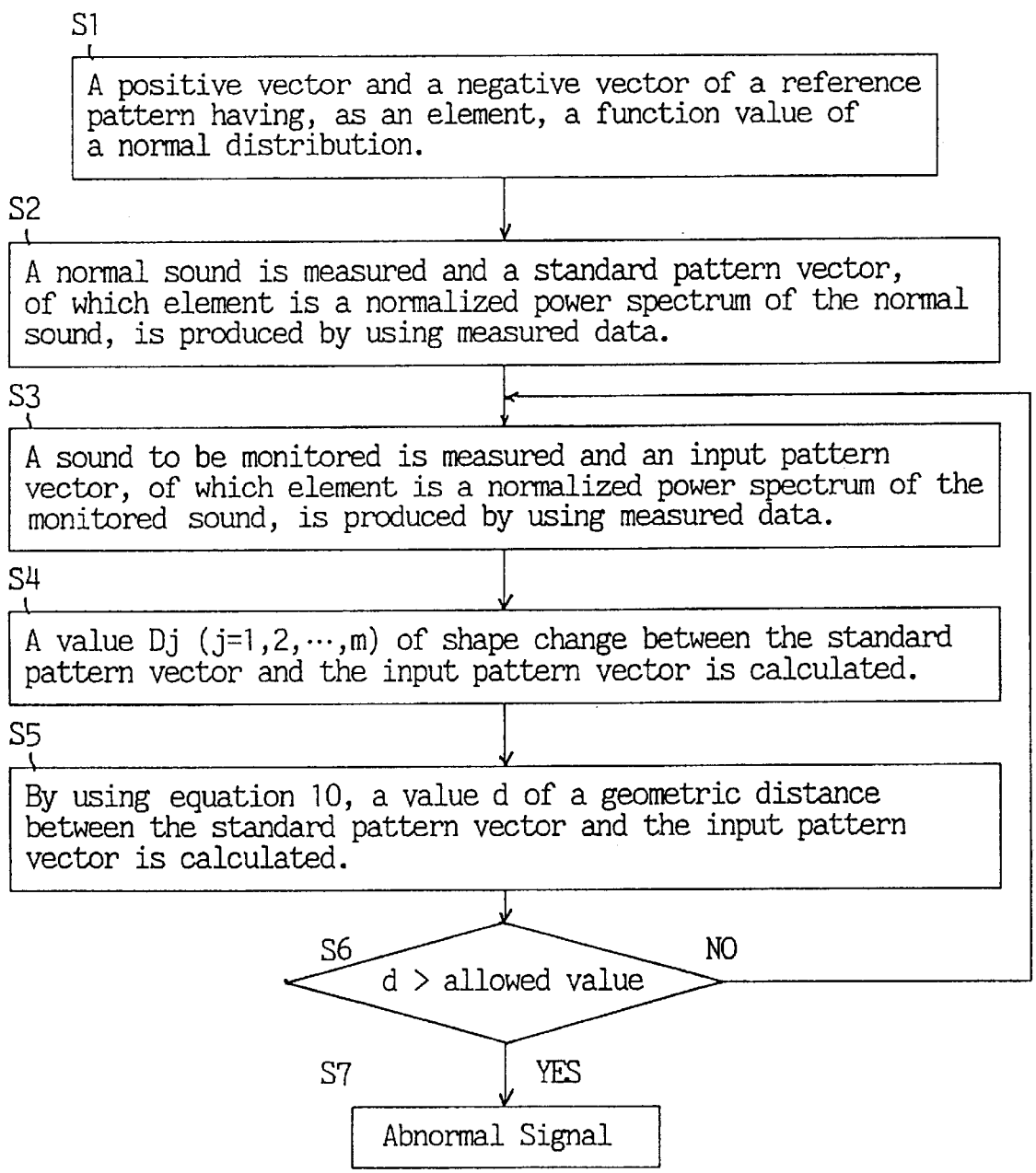
FIG. 15 shows a flow chart for monitoring a status of a machine in motion.

Next, referring to FIG. 15, monitoring for a machine in motion is described, wherein the machine is monitored by a computer which detects continuously the abnormal sound by using above-mentioned detection process.

In FIG. 15, one pair of the positive reference pattern vector and the negative reference pattern vector are produced in step S1. In step S2, the standard pattern vector is previously produced from the normal sound. In the next step S3, the input pattern vector is produced from the monitored sound. In step S4, the shape change value Dj (j=1, . . . ,m) is calculated by the steps S4-1~S4-7 shown in FIG. 12. In step S5, the geometric distance d is calculated. Then in step S6, judgement of abnormal sound is executed by comparing the geometric distance d with an allowed value. After the judgement, a process is returned to step S3.

In FIG. 15, when the geometric distance d is greater than the allowed value, it is judged that there is something wrong with the machine. Then an alarm signals output in a step S7.

Generally, the power spectrum of a sound generated from the machine varies according to time even if the sound is normal such as "GATAGOTO." In such case, a sound "GA," a sound "TA," a sound "GO," and a sound "TO" are dealt as a different sound each other. Then, four standard pattern vectors corresponding the sounds "GA," "TA," "GO," and "TO" are produced.

On the other hand, one input pattern vector is produced from the monitored sound. Then four pieces of the geometric distance between the input pattern vector and four standard pattern vectors are established. The minimum geometric distance is compared with the allowed value. When the minimum geometric distance is greater than the allowed value, it is judged that the machine is abnormal. When the minimum geometric distance is not greater than the allowed value, it is judged that the machine is normal because a sound similar to the monitored sound is included in four normal sound.

[Experiment]

Figure 16:
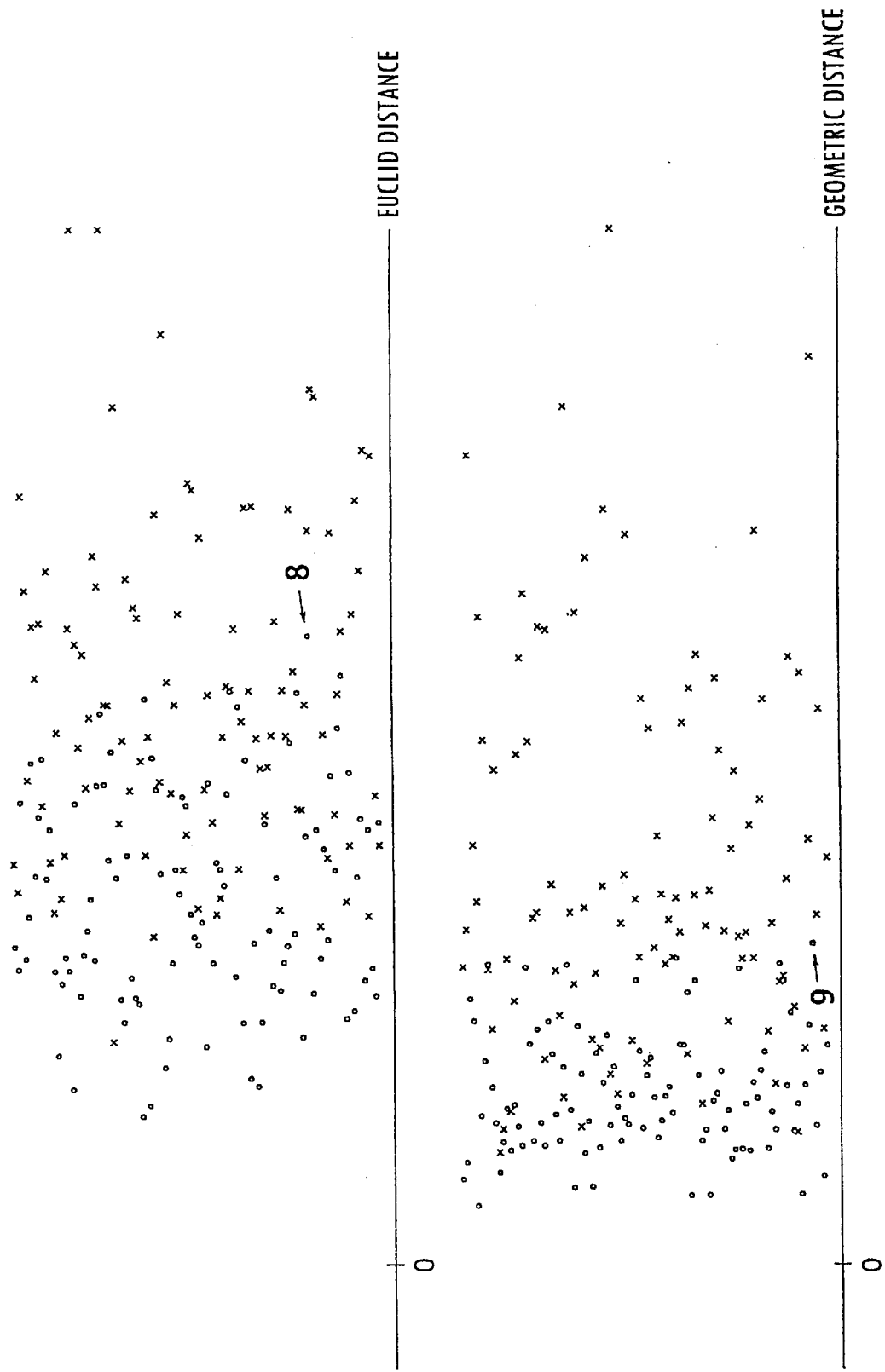
FIG. 16 shows a result of an experiment wherein a distribution of an Euclid distance between normal sounds and monitored sounds, in which normal monitored sounds and abnormal monitored sounds, are indicated in the upper row, a distribution of a geometric distance between normal sounds and monitored sounds, in which normal monitored sounds and abnormal monitored sounds, are indicated in the lower row.

A result of an experiment is described by referring to FIG. 16. FIG. 16 shows a result of the experiment wherein a distribution of an Euclid distance between normal sounds and monitored sounds, in which normal monitored sounds and abnormal monitored sounds are indicated in the upper row, a distribution of a geometric distance between normal sounds and monitored sounds, in which normal monitored sounds and abnormal monitored sounds are indicated in the lower row.

Namely, in FIG. 16, a normal sound, a monitored normal sound, and abnormal sound generated by a pump were measured in time sequence to obtain Euclid distance of measured data and the geometrical distance of measured data according to the present invention. The Euclid distance and the geometrical distance are plotted.

The sound generated by the pump are input to the seven bandpass filters, of which frequency bands are 0~250 Hz, 250~500 Hz, 500~1000 Hz, 1000~2000 Hz, 2000~4000 Hz, 4000~8000 Hz, and 8000~16000 Hz. In this experiment, an abnormal sound was produced by mixing a small sound to the normal pump sound, wherein the small sound is a synthesized noise having main frequency of 1500 Hz.

Firstly, as normal sounds, pump sounds in normal motion was, sequentially in time, measured 100 times. Then 100 standard pattern vectors were produced.

Next, one normal monitored sound was measured in normal motion, and then, one input pattern vector was produced. 100 Euclid distances were calculated by using the one input pattern vector and 100 standard pattern vectors. A minimum value of the Euclid distances was plotted by O mark, as a Euclid distance between the normal sound and the monitored normal sound, in the upper row in FIG. 16. Similarly, 100 geometric distances were calculated by using the one input pattern vector and 100 standard pattern vectors. A minimum value of the geometric distances was plotted by O mark, as a geometric distance between the normal sound and the monitored normal sound, in the lower row in FIG. 16.

Such process was, sequentially in time, executed 100 times. Namely in FIG. 16, 100 pieces of the Euclid distance are plotted by the O mark in the upper row and 100 pieces of the geometric distance are plotted by the O mark in the lower row.

On the other hand, one mixed sound, as an abnormal sound, was measured, and then, one input pattern vector was produced. 100 Euclid distances were calculated by using the one input pattern vector and 100 standard pattern vectors. A minimum value of the Euclid distances was plotted by X mark, as a Euclid distance between the normal sound and the monitored abnormal sound, in the upper row in FIG. 16. Similarly, 100 geometric distances were calculated by using the one input pattern vector and 100 standard pattern vectors. A minimum value of the geometric distances was plotted by X mark, as a geometric distance between the normal sound and the monitored abnormal sound, in the lower row in FIG. 16. Such process was, sequentially in time, executed 100 times. Namely in FIG. 16, 100 pieces of the Euclid distance are plotted by the X mark in the upper row and 100 pieces of the geometric distance are plotted by the X mark in the lower row.

In FIG. 16, a horizontal axis in the upper row denotes the Euclid distance, and a horizontal axis in the lower row denotes the geometric distance. The horizontal axis of the Euclid distance is indicated by a normalization on the basis of the maximum of the Euclid distance, and also the horizontal axis of the geometric distance is indicated by a normalization on the basis of the maximum of the geometric distance. Further, a vertical axis is expanded to prevent an overlap of the O mark and the X mark.

From FIG. 16;
(1) The O mark and the X mark in the geometric distance are greatly separated while the O mark and the X mark in the Euclid distance are closer.

(2) As shown in FIG. 16, while there are 35 pieces of X marks greater than a O mark indicated by 8 in the Euclid distance, there are 62 pieces of X marks greater than a O mark indicated by 9 in the geometric distance.

Then, while 35/100 is a probability for detecting the abnormal sound by the Euclid distance in the case of setting an allowed value at the position 8, 62/100 is a probability for detecting the abnormal sound by the geometric distance in the case of setting an allowed value at the position 9. Therefore, the present invention is more excellent than the Euclid distance.

While the normal distribution was employed in the embodiment, it is possible to calculate the geometric distance by using a rectangle etc. as the reference shape. This is understood by the equation 8. Namely, the geometric distance is not influenced by the initial kurtosis of the reference shape.

While the bandpass filter was employed for extracting the power spectrum in the embodiment, it is possible to use a Fast Fourier Transform (FFT) etc. for extracting the power spectrum.

While the power spectrum was employed as a feature value of a sound in the embodiment, it is possible to use plural Linear Predictive Coefficients etc. for calculating the geometric distance.

While the geometric distance of the sound generated by the machine was calculated in the embodiment, it is possible to recognize a speech by calculating the geometric distance of a voice spoken by a human being.

Concretely, a speech recognition is accomplished by the following process.

Namely, a standard pattern vector having a feature value of a standard voice as an element, an input pattern vector having a feature value of a voice to be monitored as an element, a positive vector of a reference pattern having a value of arbitrary reference shape such as a normal distribution or a rectangle as an element and a negative vector of said reference pattern as an element are produced.

Regarding each element, an element of said positive vector by an absolute value of a difference between an element of said input pattern vector and a corresponding element of said standard pattern vector is increased, if the element of said input pattern vector is greater than said corresponding element of said standard pattern vector.

Further, regarding each element, an element of said negative vector by an absolute value of a difference between an element of said input pattern vector and a corresponding element of said standard pattern vector is increased, if the element of said input pattern vector is less than said corresponding element of said standard pattern vector.

A difference between a kurtosis of said positive vector processed by said increasing step and a kurtosis of said negative vector processed by said increasing step is calculated, wherein a center of said reference shape is relatively moved to a position of each element of said positive vector and said negative vector respectively at every said calculation of the difference of the kurtosis.

A value of geometric distance between said standard pattern vector and said input pattern vector is obtained by calculating a square root of a value which is a sum of a square of each difference of the kurtosis.

An arbitrarily determined allowed value is compared with said geometric distance value between said standard pattern vector and said input pattern vector.

When said geometric distance value is not greater than said allowed value, it is judged that said monitored voice is said standard voice.

When said geometric distance value is greater than said allowed value, it is judged that said monitored voice is not said standard voice.

While the geometric distance of the sound generated by the machine was calculated in the embodiment, it is generally possible to calculate the geometric distance between the standard pattern vector and the input pattern vector with regard to an arbitrary oscillation wave including a low frequency wave and a high frequency wave. Further, it is possible to detect a similarity of the oscillation wave by using the calculated geometric distance. It is also possible to perform an arbitrary process with regard to the oscillation wave such as an analysis of the oscillation wave by using the detected similarity.

[Another Embodiment]

Figure 20:
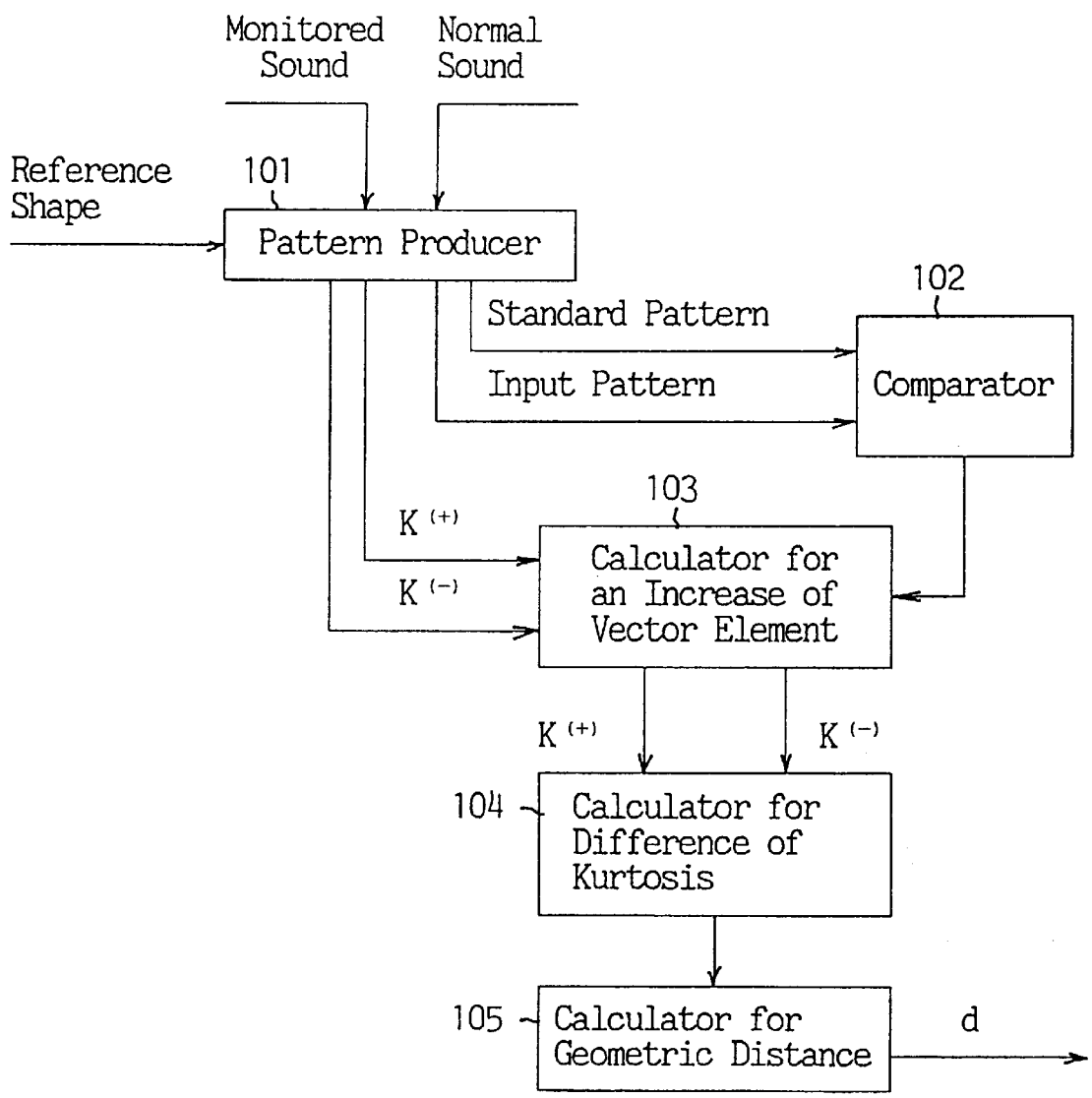
FIG. 20 shows an apparatus for detecting an abnormal sound in another embodiment.

Referring to FIG. 20, an apparatus for detecting an abnormal sound, according to another preferred embodiment, is described.

In FIG. 20, the apparatus comprises a pattern producer 101, a comparator 102, and calculators 103~105.

The pattern producer 101 produces a standard pattern vector having a feature value of a normal sound as an element, an input pattern vector having a feature value of a sound to be monitored as an element, a positive vector $K^{(+)}$ of a reference pattern having a value of arbitrary reference shape such as a normal distribution or a rectangle as an element, and a negative vector $K^{(-)}$ of said reference pattern as an element.

The comparator 102 compares whether the element of said input pattern vector is greater than said corresponding element of said standard pattern vector regarding each element.

The calculator 103 increases, regarding each element, an element of said positive vector $K^{(+)}$ by an absolute value of a difference between an element of said input pattern vector and a corresponding element of said standard pattern vector when the element of said input pattern vector is greater than said corresponding element of said standard pattern vector.

Further, the calculator 103 increases, regarding each element, an element of said negative vector $K^{(-)}$ by an absolute value of a difference between an element of said input pattern vector and a corresponding element of said standard pattern vector when the element of said input pattern vector is less than said corresponding element of said standard pattern vector.

The calculator 104 calculates a difference between a kurtosis of said positive vector $K^{(+)}$ processed by said increase means and a kurtosis of said negative vector $K^{(-)}$ processed by said increase means, wherein a center of said reference shape is relatively moved to a position of each element of said positive vector and said negative vector respectively at every said calculation of the difference of the kurtosis.

The calculator 105 obtains a value of geometric distance between said standard pattern vector and said input pattern vector by calculating a square root of a value, which is a sum of a square of each difference of the kurtosis.

[Effect of the Invention]

The present invention has the following effects (1)~(4).

(1) According to the present invention, it is possible to exactly detect the abnormal sound, which can not be detected by using such a similarity as the Euclid distance and the angle.

(2) According to the present invention, it is possible to exactly detect something wrong in a machine.

(3) According to the present invention, it is possible to exactly detect the similarity of the oscillation.

(4) According to the present invention, it is possible to exactly recognize speech.

What is claimed is:

1. An apparatus for detecting an abnormal sound, comprising:
    means for pre-establishing a standard pattern vector having a feature value of a standard sound, said standard pattern including a plurality of elements;
    means for producing an input pattern vector having a feature value of a monitored sound, said input pattern including a plurality of elements corresponding to said plurality of elements of said standard pattern;
    means for producing a positive vector of a reference pattern having a value of an arbitrary reference shape, said reference pattern including a plurality of elements corresponding to said plurality of elements of said standard pattern;
    means for producing a negative vector of said reference pattern, said reference pattern including a plurality of elements corresponding to said plurality of elements of said standard pattern;
    means for increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;
    means for calculating a difference between a kurtosis of said positive vector processed by said increasing means and a kurtosis of said negative vector processed by said increasing means; and
    means for obtaining a value of geometric distance between said standard pattern vector and said input pattern vector based on the calculated difference of the kurtosis.

2. An apparatus claimed in claim 1, wherein said standard vector producing means produces the standard vector having the feature value of a standard oscillation of a standard machine, and the input pattern vector having the feature value of an oscillation of the machine to be monitored.

3. An apparatus claimed in claim 1, wherein said geometric distance calculation means obtains said value of geometric distance between said standard pattern vector and said input pattern vector by calculating a sum of a square of each difference of the kurtosis.

4. An apparatus claimed in claim 2, wherein said geometric distance calculation means calculates said value of geometric distance between said standard pattern vector and said input pattern vector by calculating a sum of a square of each difference of the kurtosis.

5. An apparatus claimed in claim 1, wherein said arbitrary reference shape is either one of a normal distribution and a rectangle.

6. An apparatus claimed in claim 1, wherein said geometric distance calculation means obtains said value of geometric distance between said standard pattern vector and said input pattern vector by calculating a square root of a sum of a square of each difference of the kurtosis.

7. An apparatus claimed in claim 1, wherein said calculating means moves a center of said reference shape relatively to a position of each element of said positive vector and said negative vector, respectively, at every said calculation of the difference of the kurtosis.

8. A method for detecting an abnormal sound, comprising:
    pre-establishing a standard pattern vector having a feature value of a standard sound, said standard pattern including a plurality of elements;
    producing an input pattern vector having a feature value of a monitored sound, said input pattern including a plurality of elements corresponding to said plurality of elements of said standard pattern;
    producing a positive vector of a reference pattern having a value of an arbitrary reference shape, said reference pattern including a plurality of elements corresponding to said plurality of elements of said standard pattern;
    producing a negative vector of said reference pattern, said reference pattern including a plurality of elements corresponding to said plurality of elements of said standard pattern;
    increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;
    calculating a difference between a kurtosis of said positive vector processed by said increasing step and a kurtosis of said negative vector processed by said increasing step; and
    obtaining a value of geometric distance between said standard pattern vector and said input pattern vector based on the calculated difference of the kurtosis.

9. The method claimed in claim 8, wherein, in said pre-establishing a standard pattern vector step, the standard pattern vector having the feature value of a standard oscillation of a standard ma chine, and in said producing an input pattern vector step, the input pattern vector having the feature value of an oscillation of the machine to be monitored.

10. The method claimed in claim 8, wherein, in said geometric distance calculation step, said value of geometric distance between said standard pattern vector and said input pattern vector is obtained by calculating a sum of a square of each difference of the kurtosis.

11. The method claimed in claim 9, wherein, in said obtaining a value of geometric distance step, said value of geometric distance between said standard pattern vector and said input pattern vector is obtained by calculating a sum of a square of each difference of the kurtosis.

12. The method claimed in claim 8, wherein said arbitrary reference shape is either one of a normal distribution and a rectangle.

13. The method claimed in claim 8, wherein said obtaining step obtains said value of geometric distance between said standard pattern vector and said input pattern vector by calculating a square root of a sum of a square of each difference of the kurtosis.

14. The method claimed in claim 8, wherein said calculating step moves a center of said reference shape relatively to a position of each element of said positive vector and said negative vector, respectively, at every said calculation of the difference of the kurtosis.

15. A method of judging something wrong in a machine, comprising:

pre-establishing a standard pattern vector having a feature value of a standard sound, said standard pattern including a plurality of elements;

producing an input pattern vector having a feature value of a monitored sound, said input pattern including a plurality of elements corresponding to said plurality of elements of said standard pattern;

producing a positive vector of a reference pattern having a value of an arbitrary reference shape, said reference pattern including a plurality of elements corresponding to said plurality of elements of said standard pattern;

producing a negative vector of said reference pattern, said reference pattern including a plurality of elements corresponding to said plurality of elements of said standard pattern;

increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;

calculating a difference between a kurtosis of said positive vector processed by said increasing step and a kurtosis of said negative vector processed by said increasing step;

obtaining a value of geometric distance between said standard pattern vector and said input pattern vector based on the calculated difference of the kurtosis;

comparing an arbitrary determined allowed value with the geometric distance value; and judging something wrong in the machine when said geometric distance value is greater than said allowed value.

16. The method claimed in claim 15, wherein said obtaining step obtains said value of geometric distance between said standard pattern vector and said input pattern vector by calculating a square root of a sum of a square of each difference of the kurtosis.

17. The method claimed in claim 15, wherein said obtaining step obtains said value of geometric distance between said standard pattern vector and said input pattern vector by calculating a sum of a square of each difference of the kurtosis.

18. The method claimed in claim 15, wherein said arbitrary reference shape is either one of a normal distribution and a rectangle.

19. The method claimed in claim 15, wherein said calculating step moves a center of said reference shape relatively to a position of each element of said positive vector and said negative vector, respectively, at every said calculation of the difference of the kurtosis.

20. A method for detecting a similarity between a standard oscillation wave and an arbitrary monitored oscillation wave, comprising:

pre-establishing a standard pattern vector having a feature value of a standard oscillation, said standard pattern including a plurality of elements;

producing an input pattern vector having a feature value of a monitored oscillation, said input pattern including a plurality of elements corresponding to said plurality of elements of said standard pattern;

producing a positive vector of a reference pattern having a value of an arbitrary reference shape, said reference pattern including a plurality of elements corresponding to said plurality of elements of said standard pattern;

producing a negative vector of said reference pattern, said reference pattern including a plurality of elements corresponding to said plurality of elements of said standard pattern;

increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;

calculating a difference between a kurtosis of said positive vector processed by said increasing step and a kurtosis of said negative vector processed by said increasing step;

obtaining a value of geometric distance between said standard pattern vector and said input pattern vector based on the calculated difference of the kurtosis;

detecting the similarity between the standard oscillation wave and the arbitrary monitored oscillation wave base on said obtained geometric distance.

21. The method claimed in claim 20, wherein said arbitrary reference shape is either one of a normal distribution and a rectangle.

22. The method claimed in claim 20, wherein said obtaining step obtains said value of geometric distance between said standard pattern vector and said input pattern vector by calculating a square root of a sum of a square of each difference of the kurtosis.

23. The method claimed in claim 20, wherein said calculating step moves a center of said reference shape relatively to a position of each element of said positive vector and said negative vector, respectively, at every said calculation of the difference of the kurtosis.

24. The method claimed in claim 20, wherein said obtaining step obtains said value of geometric distance between said standard pattern vector and said input pattern vector by calculating a sum of a square of each difference of the kurtosis.

25. A method for recognizing a speech, comprising:
pre-establishing a standard pattern vector having a feature value of a standard voice, said standard pattern including a plurality of elements;

producing an input pattern vector having a feature value of a monitored voice, said input pattern including a plurality of elements corresponding to said plurality of elements of said standard pattern;

producing a positive vector of a reference pattern having a value of an arbitrary reference shape, said reference pattern including a plurality of elements corresponding to said plurality of elements of said standard pattern;

producing a negative vector of said reference pattern, said reference pattern including a plurality of elements corresponding to said plurality of elements of said standard pattern;

increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;

calculating a difference between a kurtosis of said positive vector processed by said increasing step and a kurtosis of said negative vector processed by said increasing step; and obtaining a value of geometric distance between said standard pattern vector and said input pattern vector based on the calculated difference of the kurtosis;

comparing an arbitrary determined allowed value with said geometric distance value between said standard pattern vector and said input pattern vector; and judging that said monitored voice is the same as said standard voice when said geometric distance value is not greater than said allowed value and that said monitored voice is not the same as said standard voice when said geometric distance value is greater than said allowed value.

26. The method claimed in claim 25, wherein said arbitrary reference shape is either one of a normal distribution and a rectangle.

27. The method claimed in claim 25, wherein said obtaining step obtains said value of geometric distance between said standard pattern vector and said input pattern vector by calculating a square root of a sum of a square of each difference of the kurtosis.

28. The method claimed in claim 25, wherein said obtaining step obtains said value of geometric distance between said standard pattern vector and said input pattern vector by calculating a sum of a square of each difference of the kurtosis.

29. The method claimed in claim 25, wherein said calculating step moves a center of said reference shape relatively to a position of each element of said positive vector and said negative vector, respectively, at every said calculation of the difference of the kurtosis.

30. An apparatus for judging something wrong in a machine, comprising:

means for pre-establishing a standard pattern vector having a feature value of a standard sound, said standard pattern including a plurality of elements;

means for producing an input pattern vector having a feature value of a monitored sound, said input pattern including a plurality of elements corresponding to said plurality of elements of said standard pattern;

means for producing a positive vector of a reference pattern having a value of an arbitrary reference shape, said reference pattern including a plurality of elements corresponding to said plurality of elements of said standard pattern;

means for producing a negative vector of said reference pattern, said reference pattern including a plurality of elements corresponding to said plurality of elements of said standard pattern;

means for increasing, with respect to each of said plurality of elements, an element of said positive vector by an absolute value of a difference between an element of said input pattern vector and a corresponding element of said standard pattern vector when the element of said input pattern vector is greater than the corresponding element of said standard pattern vector, and increasing, with respect to each of said plurality of elements, an element of said negative vector by an absolute value of a difference between an element of said input pattern vector and a corresponding element of said standard pattern vector when the element of said input pattern vector is smaller than the corresponding element of said standard vector;

means for calculating a difference between a kurtosis of said positive vector processed by said increasing means and a kurtosis of said negative vector processed by said increasing means; and means for obtaining a value of geometric distance between said standard pattern vector and said input pattern vector based on the calculated difference of the kurtosis;

means for comparing an arbitrary determined allowed value with the geometric distance value; and means for judging something wrong in the machine when said geometric distance value is greater than said allowed value.

31. The apparatus claimed in claim 30, wherein said geometric distance obtaining means obtains said a value of geometric distance between said standard pattern vector and said input pattern vector by calculating a square root of a sum of a square of each difference of the kurtosis.

32. The apparatus claimed in claim 30, wherein said geometric distance obtaining means obtains said value of geometric distance between said standard pattern vector and said input pattern vector by calculating a sum of a square of each difference of the kurtosis.

33. The apparatus claimed in claim 30, wherein said arbitrary reference shape is either one of a normal distribution and a rectangle.

34. The apparatus claimed in claim 30, wherein said calculating means moves a center of said reference shape relatively to a position of each element of said positive vector and said negative vector, respectively, at every said calculation of the difference of the kurtosis.

* * * * *